United States Patent
Ezra et al.

(10) Patent No.: US 7,246,187 B1
(45) Date of Patent: Jul. 17, 2007

(54) METHOD AND APPARATUS FOR CONTROLLING EXCLUSIVE ACCESS TO A SHARED RESOURCE IN A DATA STORAGE SYSTEM

(75) Inventors: Josef Ezra, Ashland, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 201 days.

(21) Appl. No.: 10/955,033

(22) Filed: Sep. 30, 2004

Related U.S. Application Data

(63) Continuation-in-part of application No. 10/879,476, filed on Jun. 29, 2004, now abandoned, which is a continuation of application No. 09/724,014, filed on Nov. 28, 2000, now Pat. No. 6,757,769.

(60) Provisional application No. 60/601,079, filed on Aug. 12, 2004.

(51) Int. Cl.
*G06F 12/14* (2006.01)
(52) U.S. Cl. .................. 710/200; 711/152; 711/163
(58) Field of Classification Search ...................... None
See application file for complete search history.

(56) References Cited

U.S. PATENT DOCUMENTS

| | | | |
|---|---|---|---|
| 5,206,939 A | | 4/1993 | Yanai et al. |
| 5,224,215 A | * | 6/1993 | Disbrow ..................... 709/234 |
| 5,381,539 A | | 1/1995 | Yanai et al. |
| 5,592,432 A | | 1/1997 | Vishlitzky et al. |
| 5,592,492 A | | 1/1997 | Ben-Efraim et al. |
| 5,664,144 A | | 9/1997 | Yanai et al. |
| 5,787,473 A | | 7/1998 | Vishlitzky et al. |
| 6,101,588 A | * | 8/2000 | Farley ........................ 711/168 |

(Continued)

OTHER PUBLICATIONS

Fischer, Michael J. et al., "Resource Allocation with Immunity to Limited Process Failure", 20th Annual Symposium on Foundations of Computer Science, San Juan, Puerto Rico, Oct. 1979, pp. 234-254.

(Continued)

*Primary Examiner*—Gary Portka
(74) *Attorney, Agent, or Firm*—Daly, Crowley, Mofford & Durkee, LLP

(57) ABSTRACT

A method for controlling exclusive access to a resource shared by multiple processors in a data storage system includes providing a system lock procedure to permit a processor to obtain a lock on the shared resource preventing other processors from accessing the shared resource and providing a faked lock procedure to indicate to the system lock procedure that a processor has a lock on the shared resource where such a lock does not exist, and wherein the faked lock procedure prevents another processor from obtaining the lock on the shared resource, but does not prevent other processors from accessing the shared resource. A data storage system according to the invention includes a shared resource, a plurality of processors coupled to the shared resource through a communication channel, and a lock services procedure providing the system lock procedure and the faked lock procedure. In one embodiment, the shared resource is a cache and the system lock procedure permits a processor to lock the entire cache whereas the faked lock procedure is implemented by a processor seeking exclusive access of a cache slot.

21 Claims, 14 Drawing Sheets

U.S. PATENT DOCUMENTS

| | | | |
|---|---|---|---|
| 6,282,637 B1 * | 8/2001 | Chan et al. | 712/223 |
| 6,353,869 B1 | 3/2002 | Ofer et al. | |
| 6,609,178 B1 | 8/2003 | Ofer | |
| 6,691,194 B1 | 2/2004 | Ofer | |
| 6,718,448 B1 | 4/2004 | Ofer | |
| 6,757,769 B1 | 6/2004 | Ofer | |
| 6,772,299 B2 * | 8/2004 | McWilliams et al. | 711/145 |
| 6,859,862 B1 * | 2/2005 | Liao et al. | 711/129 |
| 7,047,366 B1 * | 5/2006 | Ezra | 711/141 |

OTHER PUBLICATIONS

Fischer, Michael J. et al., "Distributed FIFo Allocation of Identical Resources Using Small Shared Space", AMC Transactions on Programming Languages and Systems, vol. 11, No. 1, Jan. 1989, pp. 90-114.

U.S. Appl. No. 10/080,321, entitled "Cache Management Via Statistically Adjusted Time Stamp Queue", with Inventors Ezra et al., filed Feb. 21, 2002.

* cited by examiner

| HOLDER_ID 231 | LOCK_MODE 233 | LOCK_PW 235 | CURRENT_HOLDER 237 | NEXT_FREE 239 |

MAIN 230

FIG. 9

| MY_ID 241 | LOCK_MODE_AUX 243 | MY_NUMBER_AUX 245 | TIME_STAMP_AUX 247 |

AUX 240

FIG. 10

METHOD AND APPARATUS FOR CONTROLLING EXCLUSIVE ACCESS TO A SHARED RESOURCE IN A DATA STORAGE SYSTEM

CROSS-REFERENCE TO RELATED APPLICATIONS

This application is a continuation-in-part of U.S. patent application Ser. No. 10/879,476, filed on Jun. 29, 2004 now abandoned, which application is a continuation of U.S. patent application Ser. No. 09/724,014 filed on Nov. 28, 2000 which issued as U.S. Pat. No. 6,757,769 on Jun. 29, 2004, both of which are hereby incorporated herein by reference in their entirety. This application also claims the benefit under 35 U.S.C. § 119(e) of U.S. Provisional Patent Application No. 60/601,079 filed on Aug. 12, 2004, which is incorporated herein by reference.

STATEMENT REGARDING FEDERALLY SPONSORED RESEARCH

Not Applicable.

FIELD OF THE INVENTION

This invention relates generally to a method and apparatus for controlling exclusive access to a resource shared by multiple processors, and more particularly to a method and apparatus for implementing such control in a data storage system.

BACKGROUND OF THE INVENTION

When a computer system resource is shared by multiple processes running on multiple processors, or even on one processor, often there must be some way of insuring that no more than one such process may access that resource at any one time. In designing complex data storage systems including multiple processors, synchronizing access to shared resources has been recognized as an issue which must be addressed in order to maintain the consistency and validity of the data. However, the sharing issue may arise in connection with almost any resource that might be used by multiple requesters.

Many high-performance storage systems are intelligent data storage systems which may be accessible by multiple host computers. These intelligent data storage systems may include, in addition to one or more storage device arrays, a number of intelligent controllers for controlling the various aspects of the data transfers associated with the storage system. In such systems, host controllers may provide the interface between the host computers and the storage system, and device controllers may be used to manage the transfer of data to and from an associated array of storage devices (e.g. disk drives). Often, the arrays may be accessed by multiple hosts and controllers. In addition, advanced storage systems, such as the SYMMETRIX® storage systems manufactured by EMC Corporation of Hopkinton, Mass., generally include a global memory which typically is shared by the controllers in the system. The memory may be used as a staging area (or cache) for the data transfers between the storage devices and the host computers and may provide a communications path which buffers data transfer between the various controllers. Various communication channels, such as busses, backplanes or networks, link the controllers to one another and the global memory, the host controllers to the host computers, and the disk controllers to the storage devices. Such systems are described, for example, in Yanai et al, U.S. Pat. No. 5,206,939 issued Apr. 27, 1993, Yanai et al, U.S. Pat. No. 5,381,539 issued Jan. 10, 1995, Vishlitzky et al, U.S. Pat. No. 5,592,492 issued Jan. 7, 1997, Yanai et al, U.S. Pat. No. 5,664,144 issued Sep. 2, 1997, and Vishlitzky et al, U.S. Pat. No. 5,787,473 issued Jul. 28, 1998, all of which are hereby incorporated herein by reference in their entirety. The systems described therein allow the controllers to act independently to perform different processing tasks and provide for distributed management of the global memory resources by the controllers. This high degree of parallelism permits improved efficiency in processing I/O tasks. Since each of the controllers may act independently, there may be contention for certain of the shared memory resources within the system. In these systems, the consistency of the data contained in some portions of global memory may be maintained by requiring each controller to lock those data structures which require consistency while it is performing any operations on them which are supposed to be atomic.

Typically, synchronization of access to a shared resource, such as the global memory in the systems described above, is accomplished by associating a lock with the resource to permit a processor that obtains the lock to have exclusive access to the resource. Queued lock management allows a processor which initially fails to obtain the lock to queue for subsequent access. Lock management, including the design and operation of lock request queues, is well known in the art. Generally, the lock request queue must be implemented in a section of memory that is also shared, or at least accessible, by all of the processors which might need access to the shared resource, although it need not be on the same media as the shared resource. The procedures which allocate the lock may be centralized or distributed. In the intelligent data processing systems described above, the lock allocation procedures are typically distributed among the various intelligent controllers.

To obtain the lock for a resource, each requester from among the processors, such as one of the controllers, must first invoke a lock allocation procedure to attempt to obtain the lock. If it is not awarded the lock, its request will be entered in the lock request queue in accordance with a predetermined priority algorithm. To determine the status of its request, the requester must poll for the lock over the communication channel which links the two. If the lock is not available, the requester must wait, typically for a predetermined, fixed period, and poll again, repeating the loop until the lock is obtained.

Since locking inherently reduces the parallelism of the system and puts a high load on system resources, locking procedures must be designed with care to preserve system efficiency.

SUMMARY OF THE INVENTION

According to the invention, a method for controlling exclusive access to a resource shared by a plurality of processors in a data storage system includes providing for each processor a system lock procedure to permit the processor to obtain a lock on the shared resource preventing other processors from accessing the shared resource and providing for each processor a faked lock procedure to indicate to the system lock procedure that the processor has a lock on the shared resource where such a lock does not exist, and wherein the faked lock procedure does not prevent other processors from accessing the shared resource. In one embodiment, the shared resource is a cache, the system lock procedure permits a processor to obtain a lock on the entire cache and the faked lock procedure is called by a processor that has a need to change the state of a cache slot and thus, to prevent other processors from having exclusive access to the cache, but without requiring an exclusive lock on the cache itself.

With this arrangement, operations requiring exclusive access to only a portion of a shared resource benefit from a system feature whereby a lock of the entire resource is not required for such access, but operations requiring exclusive access to the entire resource (i.e., requiring a system lock on the shared resource) are also possible. As one example, cache operations requiring exclusive access to only a portion of the cache, such as a single cache slot, can benefit from a cache management scheme that provides for a slot lock to obtain exclusive access to a cache slot, thereby enabling more than one processor to have exclusive access to different slots at the same time. However, exclusive access to the entire cache is possible in those operations in which such access is necessary.

Embodiments of the invention may include one or more of the following features. The system lock procedure includes maintaining a data structure indicative of whether any of the other processors has a lock on a portion of the shared resource and obtaining a lock on the shared resource in response to the data structure indicating that none of the other processors has a lock on a portion of the shared resource. A processor performing the system lock procedure is operable to send a status request message to the other processors to request their lock status and to wait for a predetermined duration to obtain the system lock in response to the data structure indicating that another processor has the lock.

The faked lock procedure includes maintaining a global-lock variable indicative of whether or not another processor has a lock on the shared resource and preventing another processor from obtaining exclusive access to the shared resource in response to the global-lock variable indicating that none of the other processors has a lock on the shared resource. The processor performing the faked lock procedure repeatedly obtains and relinquishes a lock on the shared resource in response to the global-lock variable indicating that another processor has the lock. In one embodiment, the processor is able to perform the desired operation after successfully obtaining and relinquishing the lock a predetermined number of times.

Also described is a data storage system including a shared resource, a plurality of processors coupled to the shared resource through a communication channel, and a lock services procedure implemented in each of the processors and comprising a system lock procedure to permit the processor to obtain a lock on a shared resource preventing other processors from accessing the shared resource and a faked lock procedure to indicate to the system lock procedure a lock on the shared resource by the processor where such a lock does not exist and wherein the faked lock procedure does not prevent other processors from accessing the shared resource. Each processor is operable, in accordance with the system lock procedure, to maintain a data structure indicative of whether any of the other processors has a lock on the shared resource and to obtain a lock on the shared resource in response to the data structure indicating that none of the other processors has a lock on the shared resource. And each processor is operable, in accordance with the faked lock procedure, to maintain a global-lock variable indicative of whether or not another processor has a lock on the shared resource and to obtain exclusive access to a portion of the shared resource in response to the global-lock variable indicating that none of the other processors has a lock on the shared resource.

BRIEF DESCRIPTION OF THE DRAWINGS

The foregoing features of this invention, as well as the invention itself may be more fully understood from the following description of the drawings in which:

FIG. 9 is a schematic diagram of the main lock data structure used to implement the REAL_LOCK process referenced in FIG. 4;

FIG. 10 is a schematic diagram of the auxiliary lock data structure used to implement the REAL_LOCK process referenced in FIG. 4;

DESCRIPTION OF THE PREFERRED EMBODIMENT

Figure 1:
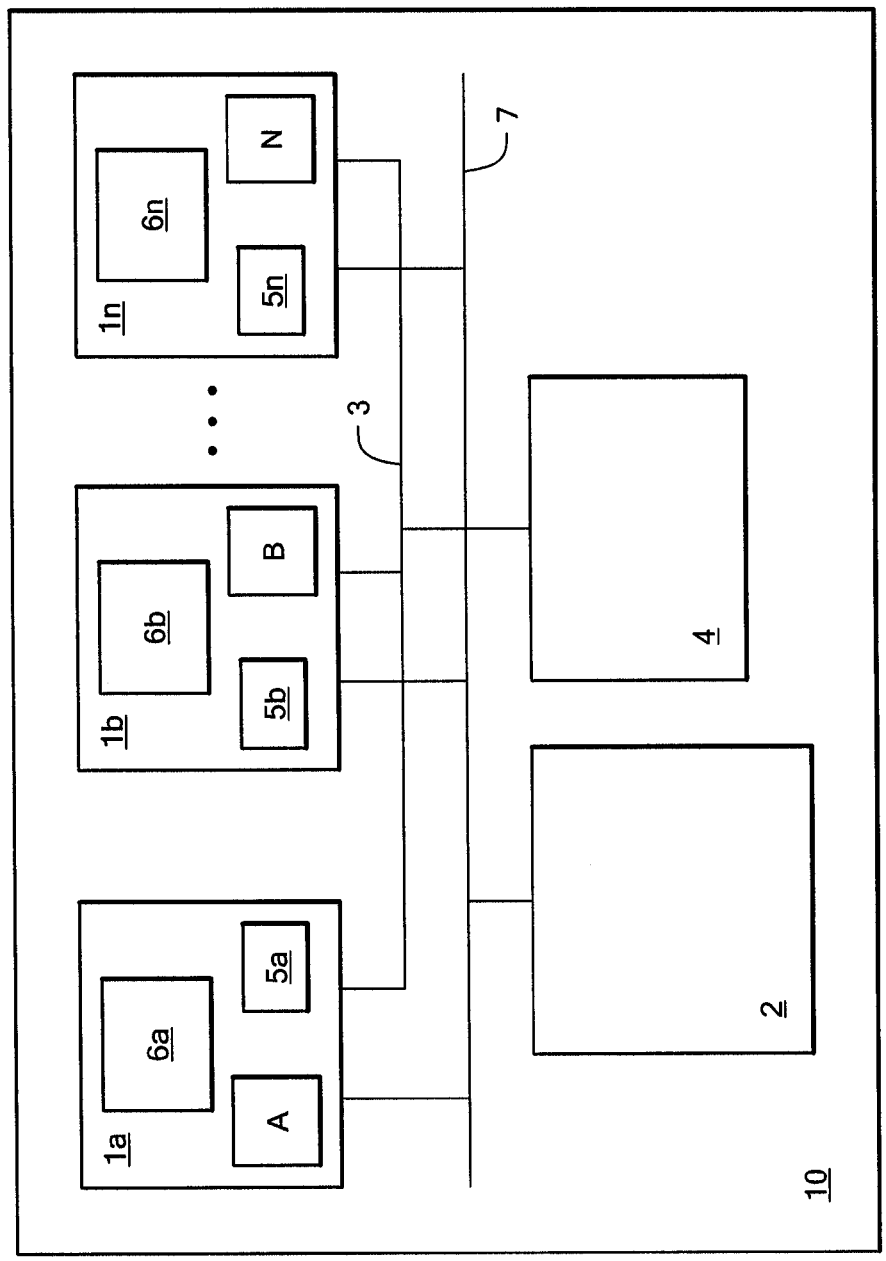
FIG. 1 is a block diagram of a computer system including a shared resource and incorporating the present invention.

Referring now to FIG. 1, computer system 10 is shown to include, among other things, a plurality of processors 1a-1n, running processes A-N, coupled to a shared resource 4 via one or more first common communication channels 3a-n and to a shared memory 2 via one or more second common communication channels 7a-n. For purposes of illustration, only one first common communication channel 3 and one second common communication channel 7 are shown in FIG. 1. Any or all of processors 1a-1n may request access to shared resource 4 in order to execute their processes A-N. The processors are actual or virtual digital processing units which may include one or more CPU's or which may be included on a single CPU and include additional local memory 5a-n. For example, processor 1a may be an intelligent device controller, an open-systems computer, a personal computer, a server, an intelligent host controller or a virtual system residing on a mainframe computer. Since each of the computer systems just mentioned typically communicates using a specific communication protocol, each of the first and second common communication channels will correspondingly be those channels specific to the computer system to which they are coupled. That is, for example, assuming processor 1b is an open-systems type server (e.g. running the UNIX Operating System), channel 3 or 7 would typically be a SCSI type communications bus or a fiber-channel communications path. All communications over channel 3 or 7 would therefore adhere to the respective SCSI or fibre-channel communications protocols. Processes A-N may be, for example, procedures run by the processors, operating system processes or higher level applications. The processors may run other processes not involving shared resource 4. The invention may also be applicable to multiple processes contending for a shared resource but running on a single processor, although this aspect is not illustrated in the drawings.

To synchronize accesses to the shared resource 4 and provide data consistency, system 10 also provides a lock services procedure 6a-6n running on each of processors 1a-1n, respectively. The procedures 6a-6n may be centralized or distributed. In the intelligent data processing systems described above, the lock services procedures are typically distributed among the various intelligent controllers.

Each processor typically invokes its lock services procedure, for example procedure 6b for processor 1b, before starting a transaction on the shared resource 4. According to the invention, the lock services procedure 6a-6n includes different procedures that are called depending on the particular type of shared resource access required. Namely, a system lock procedure permits a processor to obtain a lock on the shared resource preventing other processors from accessing the shared resource and a faked lock procedure is used when a processor requires exclusive access to a portion of the shared resource in order to falsely indicate to the system lock procedure that the processor has a lock on the resource when no such lock exists and without preventing other processors from accessing the shared resource.

The shared resource 4 of computer system 10 may be almost any resource that might be used by multiple processes, such as a mass storage device, a memory, a data structure within a memory, an ATM or a communication device. The shared memory 2 of computer system 10 is mutually shared by or accessible to the processors 1a-n. The shared memory 2 and shared resource 4 may be contained in a single logical object, in separate logical objects contained in a single physical object, such as two portions of a global memory, or they may be separate physical and logical objects, such as a memory and a disk drive. In one aspect, the invention is implemented in an intelligent data storage system which includes several individual components coupled via internal communications channels, and the shared resource 4 is one or more of a set of shared data resources, such as data records, data management records and blocks of data, in the data storage system.

Figure 2:
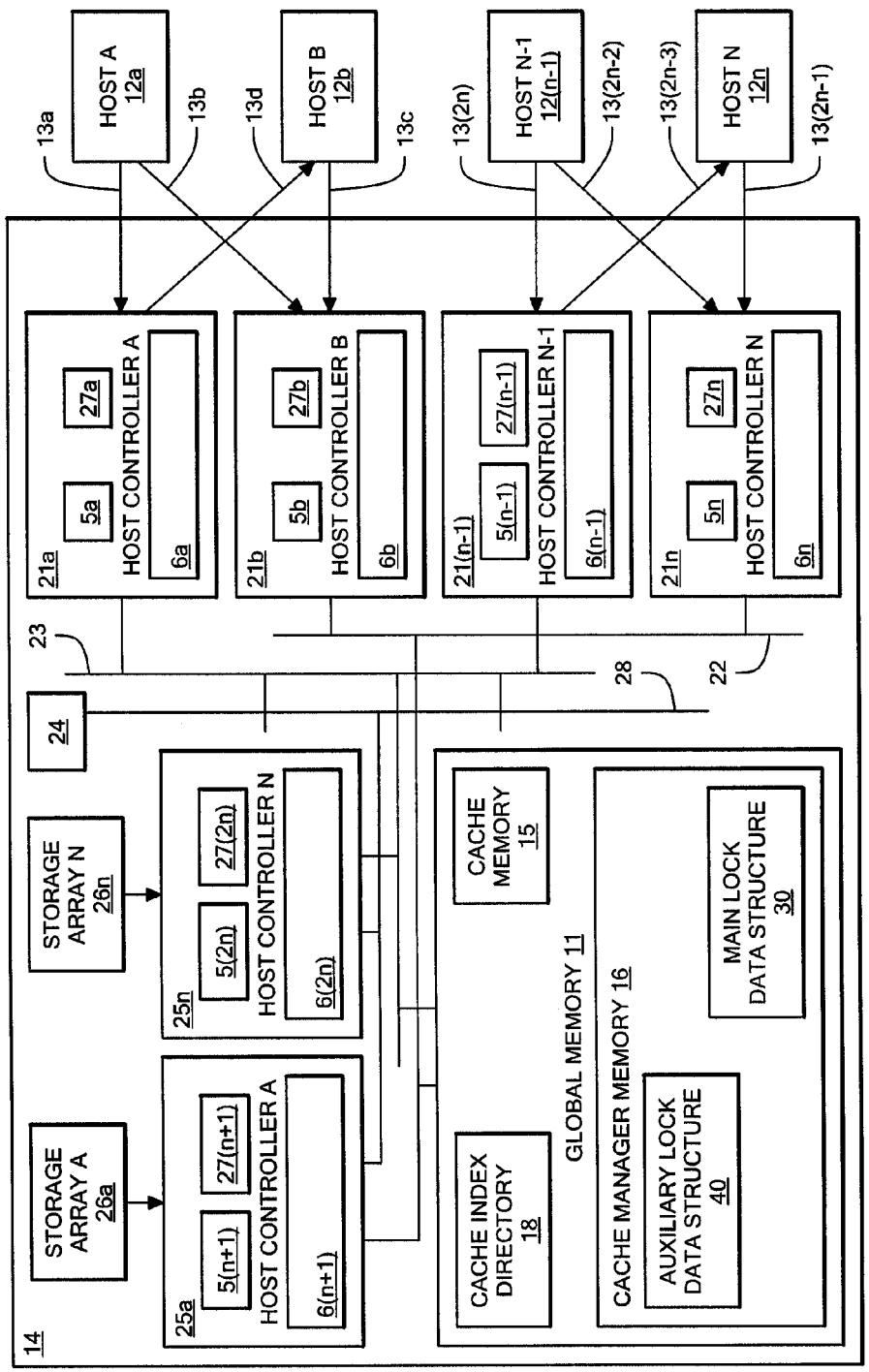
FIG. 2 is a more detailed block diagram of the computer system of FIG. 1 including an intelligent mass storage system.

Referring now to FIG. 2, the computer system 10 of FIG. 1 is shown in more detail. Computer system 10 includes an intelligent data storage system 14, and may also include a plurality of host processors 12a-12n connected to the intelligent data storage system 14 by host communication channels 13a-13(2n). The storage system 14 includes a plurality of host controllers 21a-21n, referred to alternatively as host directors, which are, according to a preferred embodiment, coupled alternately to buses 22 and 23. Each host controller 21a-21n is responsible for managing the communication between its associated attached host computers and storage system 14. Storage system 14 also includes a global memory 11 coupled to both buses 22 and 23. Preferably, the global memory 11 is a high speed random access semiconductor memory. Global memory 11 includes a large cache memory 15 which is used during the transfer of data between the host computers and the storage devices of arrays 26a-26n. The global memory 11 also includes a cache manager memory 16 and a cache index directory 18 which provides an indication of the data which is stored in the cache memory 15 and provides the addresses of the data which is stored in the cache memory. The cache manager memory 16 includes a main lock data structure 30 and an auxiliary lock data structure 40, for use in connection with a REAL_LOCK routine and a REAL_UNLOCK routine described further below. The cache manager memory 16 may also include a replacement queue (not shown) in embodiments utilizing a replacement queue for cache management purposes.

Also coupled alternately to buses 22 and 23 are a plurality of device controllers 25a-25n, referred to alternatively as device or disk directors. Coupled to each device controller is an array of mass storage devices 26a-26n which as shown here may be magnetic disk devices. As with the host controllers described above, each device controller is responsible for managing the communications between its associated array of drives and the host controllers 21a-21n or global memory 11 of storage system 14.

Procedures 6a-6(2n) are the lock services procedures of the invention, which are described in detail below. Procedures 27a-27(2n) are the cache slot management procedures for host controllers 21a-21n and device controllers 25a-25n respectively, by which the processor is able to obtain a cache slot. Thus, in the illustrative embodiment, the shared resource 4 is the cache 15, the processors 1a-n are the host controllers 21a-21n and device controllers 25a-25n, processes A-N are the cache management procedures 27a-27(2n) which manage the process of obtaining a cache slot, and the shared memory 2 is the cache 15. The busses 22 and 23 provide access to the shared resource 4, so these are the first communication channels 3a-3n. The busses 22 and 23 also provide access to the shared memory 2 so these are the second communication channels 7a-7n. Local memory 5a-5n will typically be implemented on both host controllers 21a-21n and device controllers 25a-25n. As will be described below, certain variables are stored in the local memory 5a-5n for use in executing the lock services procedure 6a-6(2n) that is described further in connection with the flow diagrams below.

A message bus 28 interconnects all of the host controllers 21a-21n and the device controllers 25a-25n through a switch 24 that is operable to interrupt the controller processors with interrupt messages received from other processors. The processors communicate with each other via interrupt messages on the message bus 28 in the execution of the lock services procedures 6a-6(2n) of the invention.

A set of shared data resources in which data may be stored are implemented in data storage system 14 and accessible by a plurality of the processors in system 10. Some or all of the data records, blocks of data and data management records in the global memory 11 and device arrays 26a-26n may be shared data resources.

By way of example and in order illustrate aspects of the invention, the invention will be explained by treating the cache 15 as the shared resource 4. It will be understood however that the typical intelligent data storage system 14 includes many shared data resources, in addition to the cache 15. The invention is equally applicable to any shared resource 4 in a system 10 which may be accessed by a plurality of the processors. By way of example and not by way of limitation, other shared resources in intelligent data storage system 14 may include a cache index directory 18, other data structures in cache manager memory 16, some or all of the data records in cache memory 15, and some or all of the blocks of data on disk arrays 26a-26n. Intelligent data storage systems for certain applications, such as those supporting airline reservation systems, may require extensive locking of shared data resources, while other applications may require locking of fewer data resources.

The cache 15 has a lower data access time than the disk drives. Data that is accessed is copied from the disk drives to the cache so that subsequent accesses of the data may be made to the cache rather than to the disk drives. Once the cache is full, data that has not been accessed recently may be removed from the cache and written back to the storage device to make room for new data. A line of data or a data element in the cache 15 is often referred to as a "cache slot." The decision as to which cache slot to select for replacement depends on how the cache is managed. Typically, the cache slot selected for replacement is one that has not been accessed recently.

Figure 3:
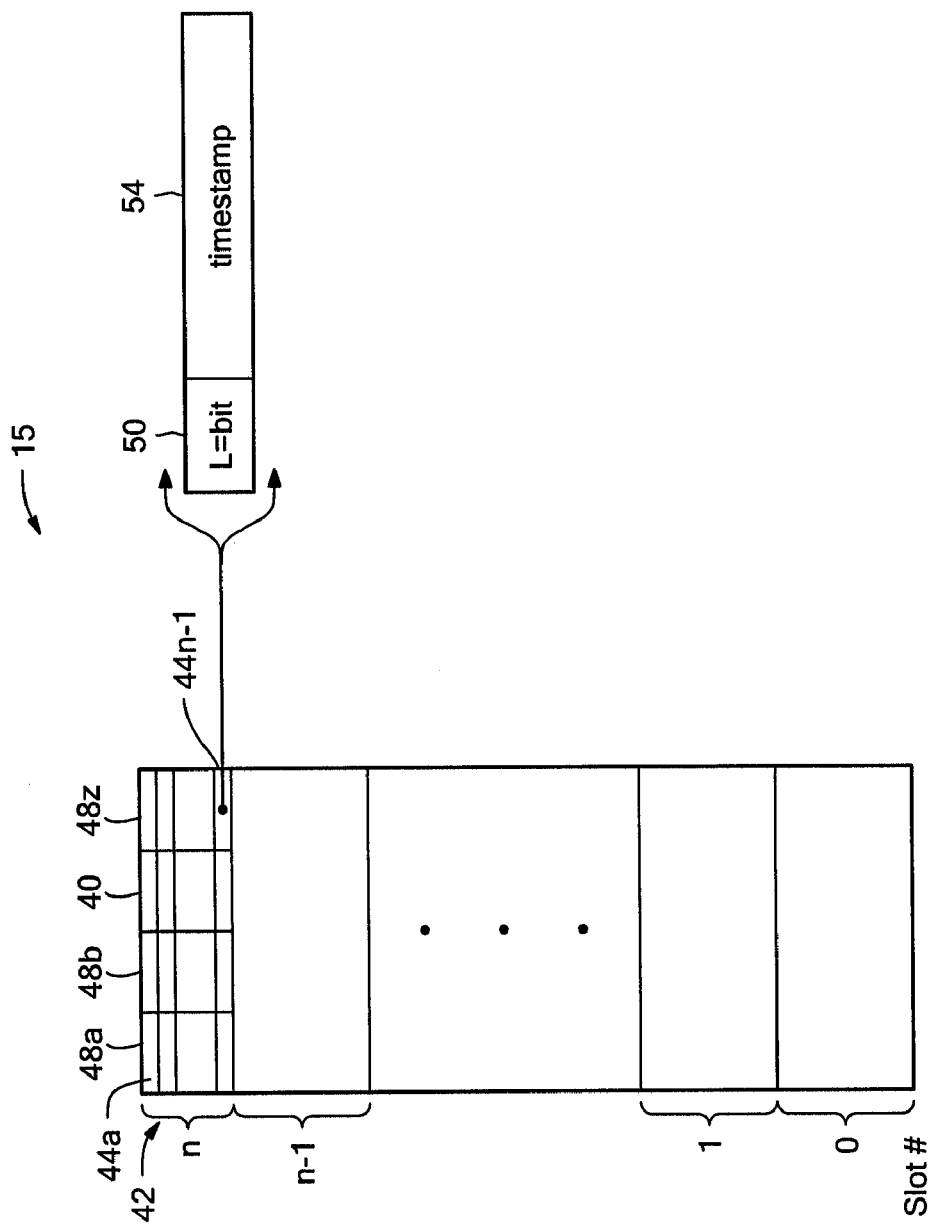
FIG. 3 shows an example of a cache memory bank having a control slot in which is stored a tag associated with each cache slot.

Referring also to FIG. 3, the computer system 10 implements a tag-based control, or management scheme for controlling cache slot replacement and includes a cache arrangement as shown. The cache 15 includes a plurality of slots, numbered 0-n. The cache 15 is organized into one or more memory banks, of which only one memory bank 40 is shown for simplicity of illustration. The cache memory bank 40 includes a control slot 42, here slot n, that contains information regarding the other slots in the memory bank 40. To this end, the control slot 42 includes a plurality of tags 44a-44n-1, each corresponding to a respective one of the cache slots 0-n-1. The tags 44a-44n-1 are arranged in groups, referred to as extents 48a-48z. The number of tags in an extent is selected so as to provide a balance between the extent representing a good statistical sample of the cache while also requiring as few direct memory accesses (DMA) as possible. Each extent may include, for example, 190 tags. Other numbers of tags may be associated with an extent that may vary in accordance with each embodiment.

An illustrative tag format is shown in connection with tag 44n-1 to include an L-bit 50 and a 15 bit time stamp value 54. The L-bit, which may be the upper bit in the 2-byte tag arrangement, may be used to indicate the availability of the cache slot associated with the particular tag. This L-bit may be used in performing operations in which a processing block may be to obtain a cache slot. The time stamp value indicates, within a particular resolution, such as ½ second, when the associated slot was last used. For example, when there is a cache "hit" to a particular slot, the associated time stamp is updated with a new time stamp value. In the illustrated embodiment, the tag size is 2 bytes or 16 bits. However, it will be appreciated by those of ordinary skill in the art that other tag sizes and tag formats may be used.

One technique for determining which slot to replace may, for example, determine the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots. This cache management scheme is implemented by procedures 27a-27(2n) (FIG. 2) and is described in further detail in a co-pending U.S. patent application Ser. No. 10/080,321, entitled "Cache Management Via Statistically Adjusted Time Stamp Queue", with inventors Ezra, et al., which application is hereby incorporated herein by reference in its entirety.

Advantageously, with a tag-based cache management scheme, when a processor has a need to change the state of a cache slot (e.g., to modify a slot's holder or pointer to a track or flags) and therefore, to prevent other processors from obtaining exclusive access to the cache, it is not necessary to prevent other processors from obtaining access to cache slots. In order to change the state of a cache slot, a single memory word is used in an atomic compare and swap operation. Thus, no lock of the shared resource of the cache is required in order for a processor to change the state of a cache slot in a system implementing a tag-based cache management scheme. This is because in a tag-based cache system, a cache slot doesn't point to other cache slots. Rather, the tags are examined to identify an available slot. If a slot is determined to be available, an atomic "compare and swap" operation is performed by which the L-bit and time stamp of a current tag is tested to see if either value has changed since a prior determination. If the values have not changed, then, in global memory, the new tag is written (new and old tags may not be identical). Even though the determination that a particular slot is available may be performed by more than one processor at the same time, only one processor will be able to change the slot's tag, since the atomic compare and swap operation is performed by only one processor at a time in an uninterrupted fashion. In this regard, the tag-based cache management scheme as described in further detail in the above-referenced co-pending patent application is in contrast to conventional cache management schemes utilizing a replacement queue, sometimes referred to as a "least recently used" (LRU) chain queue, or simply an LRU, for identifying the least-recently-used data element in the cache. In the LRU, each cache slot is linked to another cache slot by forward and backward pointers. Because of the structure of the LRU, when a processor has a need to change the state of a cache slot (i.e. change it's own pointers, and other slots' back-pointers) and therefore to obtain exclusive access to the cache slot, it is necessary for that processor to obtain a lock on the entire LRU. Queued lock schemes of this type are described, for example, U.S. Pat. No. 6,353,869 to Ofer et al. issued on Mar. 5, 2003, U.S. Pat. No. 6,609,178 to Ofer issued on Aug. 19, 2003, U.S. Pat. No. 6,718,448 to Ofer issued on Apr. 6, 2004, and U.S. Pat. No. 6,691,194 to Ofer issued on Feb. 10, 2004, all of which are hereby incorporated herein by reference in their entirety. Thus, the same cache operation requiring a lock on the shared resource of the LRU in a conventional LRU system does not require a lock on the shared resource of the cache in a tag-based system.

A tag-based cache system is one example of a system in which a lock mechanism is not required to permit exclusive access by more than one processor to different portions of a shared resource. Other such systems that have a shared resource that does not contain pointers and thus, that can permit a lock on a portion of the shared resource without requiring the entire resource to be locked are possible and are within the scope of the invention.

According to the invention, the lock services procedure 6a-6(2n) running on each of the processors accessing the cache 15, including processors of the host controllers 21a-21n and device controllers 25a-25n, includes a system lock procedure to permit the processor to obtain a lock on the shared resource while preventing other processors from accessing the shared resource and a faked lock procedure for use when a processor requires exclusive access to a portion of the shared resource, in order to falsely indicate to the system lock procedure that the processor has a lock on the shared resource where such a lock does not exist and without preventing other processors from accessing the shared resource. With this arrangement, operations requiring exclusive access to only a portion of a shared resource benefit from a system feature whereby a lock on the entire resource is not required for such access, but operations requiring exclusive access to the entire resource (i.e., requiring a "system lock" on the shared resource) are also possible. As one example, cache operations requiring exclusive access to only a portion of the cache, such as a single cache slot, benefit from tag-based cache management in the sense that a lock on the entire cache is not required, thereby enabling more than one processor to have exclusive access to different slots (i.e., a "slot lock"). However, exclusive access to the entire cache is possible in those operations in which such access is necessary. Illustrative operations of this type include cache recovery operations (i.e., for cleaning a dead processor's slot locks and re-counting write pending slots) and for scrubbing (i.e., if a damaged locked slot is found, re-testing under a system lock in order to ensure that the slot's holder and flags are not manipulated by other processors during the test).

The flow diagrams shown herein illustrate techniques which would be implemented in an electronic device or in a computer processor, such as the processors of host controllers 21a-21n and device controllers 25a-25n. Rectangular elements, herein denoted "processing blocks," can represent computer software instructions or groups of instructions. Diamond shaped elements, herein denoted "decision blocks," can represent computer software instructions, or groups of instructions that affect the execution of the computer software instructions represented by the processing blocks. Alternatively, the processing and decision blocks represent functions performed by functionally equivalent circuits, such as a digital signal processor circuit or application specific integrated circuit (ASIC), or discrete electrical components. The flow diagrams do not depict the syntax of any particular programming language. Rather, the flow diagrams illustrate the functional information one of ordinary skill in the art requires to fabricate circuits or to generate computer software to perform the processing required of the particular apparatus. It will be appreciated by those of ordinary skill in the art that, unless otherwise indicated herein, the particular sequence of blocks described is illustrative only and can be varied without departing from the spirit of the invention. Thus, unless otherwise stated, the blocks described below are unordered meaning that, when possible, the blocks can be performed in any convenient or desirable order.

Figure 4:
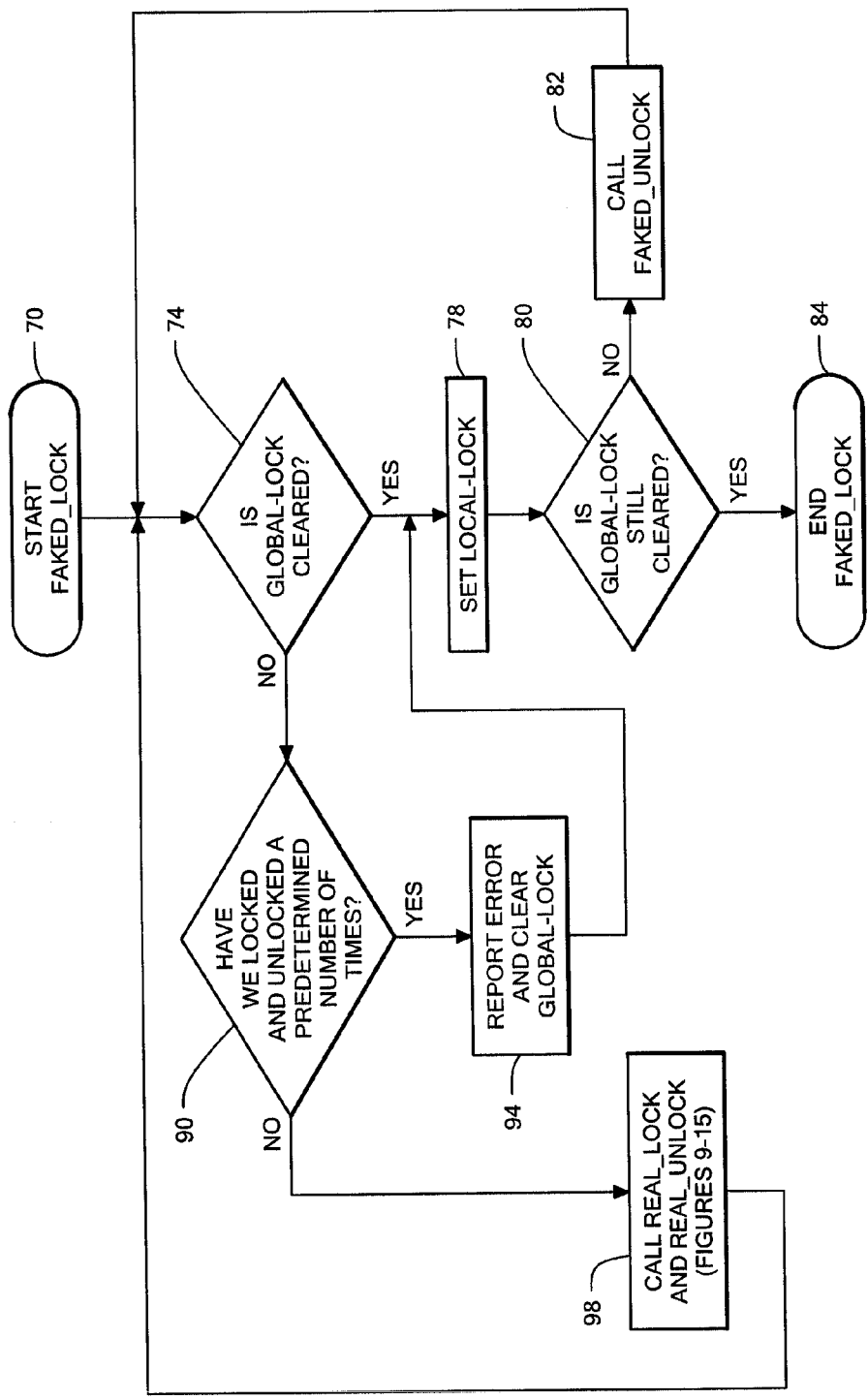
FIG. 4 is a flow diagram illustrating a FAKED_LOCK process implemented by a processor that has a need to change the state of a cache slot.

The process of FIG. 4, referred to herein as the FAKED_LOCK process or simply the faked lock procedure, is executed by a processor when the processor has a need to change the state of a cache slot and thus, to prevent other processors from obtaining exclusive access to the cache. The process commences at block 70, following which it is determined in block 74 whether or not a global-lock variable is cleared. The global-lock variable is stored in the local memory 5a-5n and is used to indicate whether or not another processor has a lock on the entire cache 15. In the illustrative embodiment, when the global-lock variable is cleared (e.g., as may correspond to a logic zero), then no other processor has a lock on the entire cache and when the global-lock variable is not cleared (e.g., is set, as may correspond to a logic one), then another processor has a lock on the entire cache. A local-lock variable is also stored in the local memory and is used to indicate whether or not the respective processor wants other processors to receive a false indication that the processor has exclusive access to the cached. In the illustrative embodiment, when the local-lock variable is cleared (e.g., as may correspond to a logic zero), then the processor does not want to provide the false indication that it has exclusive access to the cache and when the local-lock variable is not cleared (e.g., is set, as may correspond to a logic one), then the processor wants to provide the false indication that it has exclusive access to the cache. Both the local-lock variable and the global-lock variable are initialized to zero.

If it is determined in block 74 that the global-lock variable is cleared, meaning that no other processor has a lock on the cache, then the local-lock variable is set in block 78. In block 80, it is determined if the global-lock variable is still cleared. If the global-lock variable is still cleared, then the FAKED_LOCK process ends in block 84, following which the processor can perform the required cache operation. Alternatively, if the global-lock variable is not still cleared, then the FAKED_UNLOCK routine (FIG. 5) is called in block 82, following which the process resumes at block 74. If the global-lock variable is determined to be set in block 80, then it may have been set before or after the local-lock variable was set in block 78. If the global-lock variable was set before the local-lock variable was set, then a "GO" interrupt message was already sent to the processor holding the system lock. Otherwise, if the global-lock variable was set after the local-lock variable was set, then it is necessary to notify the processor holding the lock that the local-lock variable was cleared. This is achieved by calling the FAKED_UNLOCK routine in block 82. And use of the FAKED_UNLOCK routine is not harmful in the case where the global-lock variable was set before the local-lock variable.

If it is determined in block 74 that the global-lock variable is not cleared, meaning that another processor has a lock on the cache, then in block 90 it is determined whether the processor has obtained a real lock on the cache and relinquished the real lock a predetermined number of times. If this condition has not occurred, then the real lock on the cache is sought by calling a REAL_LOCK routine and, if obtained, the real lock is relinquished by calling a REAL_UNLOCK routine in block 98, following which it is again determined if the global-lock variable is cleared in block 74. The "real lock" refers to a lock on the cache (i.e., the system lock) obtained and relinquished according to the REAL_LOCK routine and the REAL_UNLOCK routine, respectively, which routines are described below in conjunction with FIGS. 9-15. Suffice it to say here that obtaining the real lock includes reading the main data structure 30 from global memory to determine if the cache is locked and if it is locked, entering the lock request queue and periodically polling for and obtaining the lock. In one illustrative embodiment, the predetermined number of times for obtaining and relinquishing the real lock on the cache is 100. However, it will be appreciated that this number may be readily varied to suit a particular embodiment.

If the processor is able to successfully lock and unlock the cache the predetermined number of times, then it is presumed that the global-lock variable is erroneously set, as may occur if there is a failure, for example, a failure of a processor responsible for setting the global-lock variable or a failure of the message bus. In this case, an error is reported and the global-lock variable is cleared in block 94, following which the process proceeds to block 78, as shown.

As will be appreciated by those of ordinary skill in the art, the FAKED_LOCK process does not invoke a conventional lock mechanism by which the cache is not available to other processors. Rather, multiple processors can implement the process of FIG. 4 to change the state of a respective cache slot at the same time. The purpose of the FAKED_LOCK procedure is to falsely indicate to the other processors and, more particularly, to the system lock procedure of FIG. 7 implemented by other processors, through the use of the local-lock variable, that a lock on the cache exists when in fact, it does not, thereby creating an operation block where no other processor can have exclusive access to the cache and without requiring an exclusive lock itself.

Figure 5:
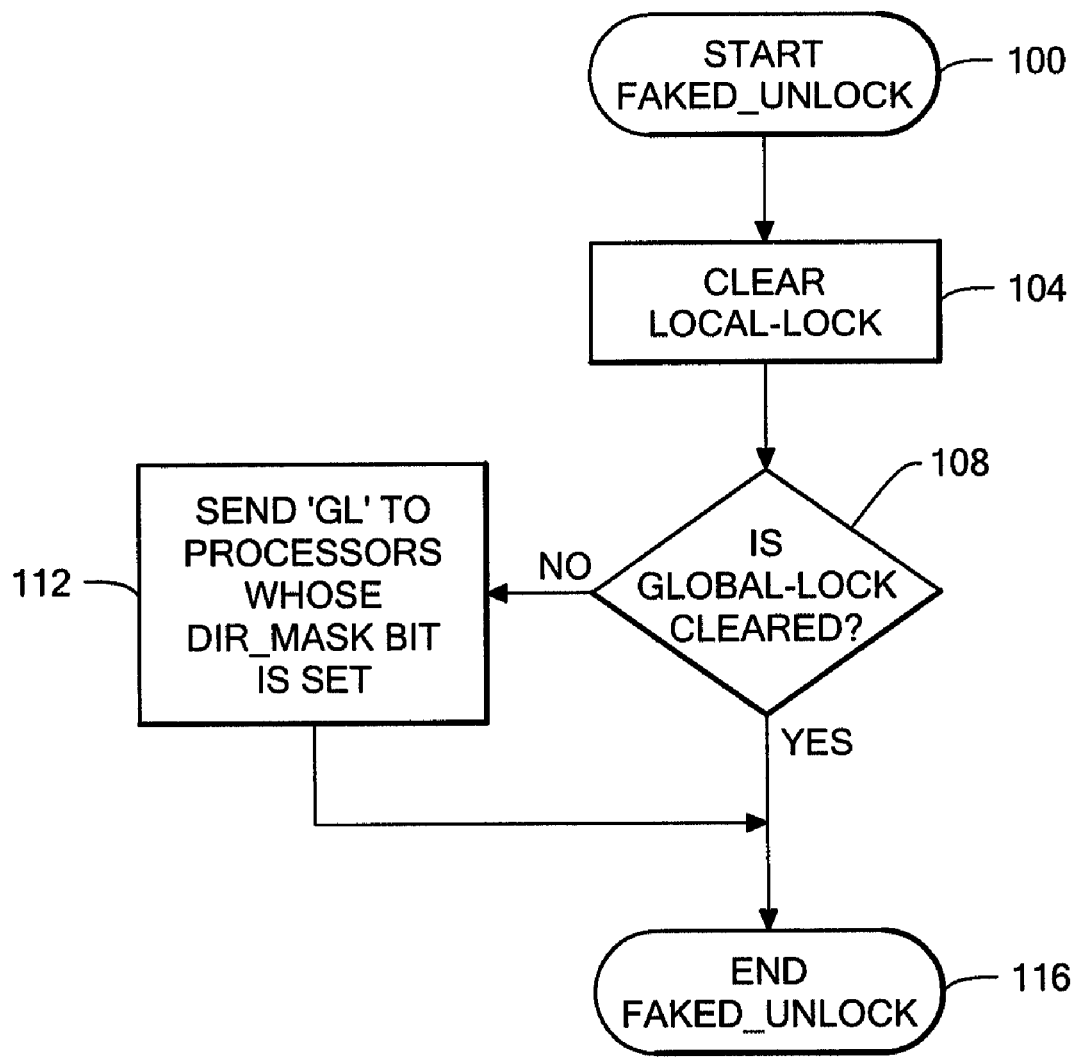
FIG. 5 is a flow diagram illustrating a FAKED_UNLOCK process implemented by a processor that has completed a change to the state of a cache slot.

Referring to FIG. 5, a process, referred to herein as the FAKED_UNLOCK process, is executed by a processor that has completed the desired operation. The process commences at block 100, following which the local-lock variable is cleared in block 104. In block 108, it is determined whether or not the global-lock variable is cleared. If the global-lock variable is cleared, then the FAKED_UNLOCK process terminates in block 116. If however, the global-lock variable is set, then a GL interrupt message is sent to other processors whose DIR_MASK bit is set in block 112, following which the process ends in block 116. As will become apparent, the GL message indicates to these other processors that they are permitted to lock the cache since the sending processor no longer has exclusive use of a cache slot.

DIR_MASK refers to a data structure stored in the local memory of each processor for the purpose of maintaining information about the state of the local-lock variable of all of the other processors or the identity of a processor requesting the system lock. In the illustrative embodiment, the DIR_MASK structure contains a single bit for each processor in the computer system and the bit associated with a particular processor being set may indicate that the particular processor confirmed our system lock request. As will become apparent from FIG. 6, receipt of the GL message by a processor causes the processor to set the bit in the DIR_MASK structure corresponding to the processor sending the GL message, since the GL message is sent only after the sender's local-lock variable is cleared.

Figure 6:
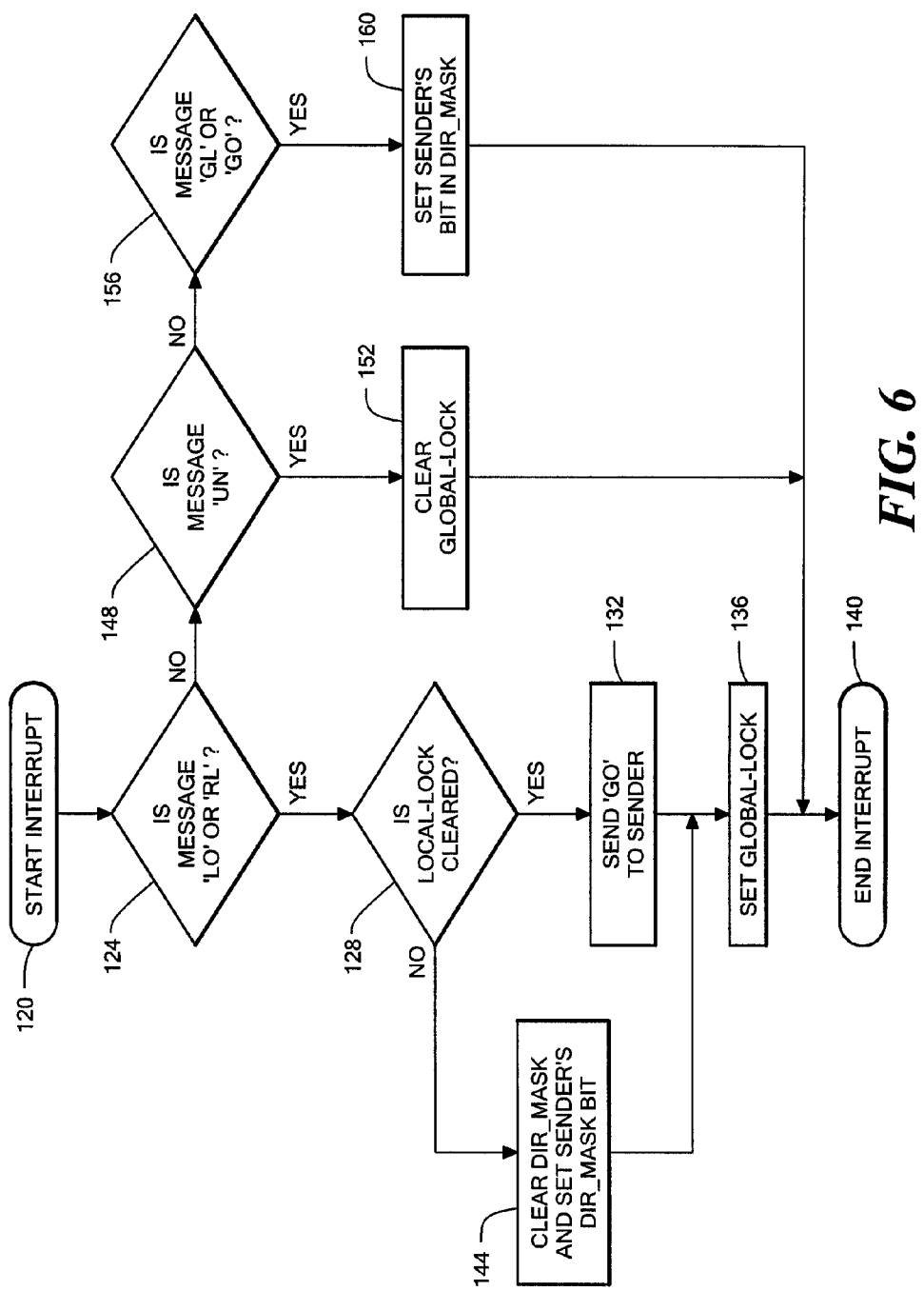
FIG. 6 is a flow diagram illustrating an INTERRUPT process implemented by a processor receiving an interrupt message from another processor.

Referring to FIG. 6, a process performed by all of the processors in response to receipt of an interrupt message over the message bus 28 (FIG. 2) is described. The process commences at block 120 with the receipt of an interrupt message, following which it is determined in block 124 whether the received message is an LO or an RL message. These messages are described in connection with the LOCK_ALL_SYSTEM routine of FIG. 7. Suffice it to say here that these messages are sent by a processor that has a lock on the entire cache (i.e., the system lock).

If the received message is an LO or an RL message, then it is determined in block 128 whether or not the local-lock variable is cleared. If the local-lock variable is cleared, then the processor sends a GO interrupt message to the sender of the LO or RL message in order to indicate to the sender that the processor does not have exclusive access to a cache slot and therefore, that the sender may obtain the system lock on the entire cache. The processor sets the global-lock variable in block 136, following which the interrupt processing terminates in block 140. If it is determined in block 128 that the local-lock variable is set, then the DIR_MASK structure is cleared and the DIR_MASK bit associated with the sender of the interrupt message is set in block 144, following which processing proceeds to block 136 by setting the global-lock variable. Thus, in the context of block 144, a DIR_MASK bit being set indicates the identity of a processor requesting the system lock.

In block 148, it is determined whether the received interrupt message is a UN message. The UN message is described in connection with the LOCK_ALL_SYSTEM routine of FIG. 7. Suffice it to say here that this message is sent by a processor that is in the process of relinquishing a lock on the entire cache. If the received message is a UN message, then the global-lock variable is cleared in block 152, thereby indicating that none of the other processors has the system lock on the entire cache.

In block 156, it is determined whether the received interrupt message is a GL or a GO message. Recall from block 112 of FIG. 5 that a GL message indicates to the receiving processor that it may lock the cache, since the sending processor no longer has exclusive use of a cache slot and recall from block 132 of FIG. 6 that a GO message provides a similar indication. If the interrupt message is a GL or a GO message, then in block 160, the bit in the DIR_MASK structure associated with the sending processor is set, following which the process ends in block 140. Thus, in the context of block 160, a DIR_MASK bit being set indicates the state of the local-lock variable of the processor that sent a GL or a GO message or the processor performing the routine of FIG. 6.

Figure 7:
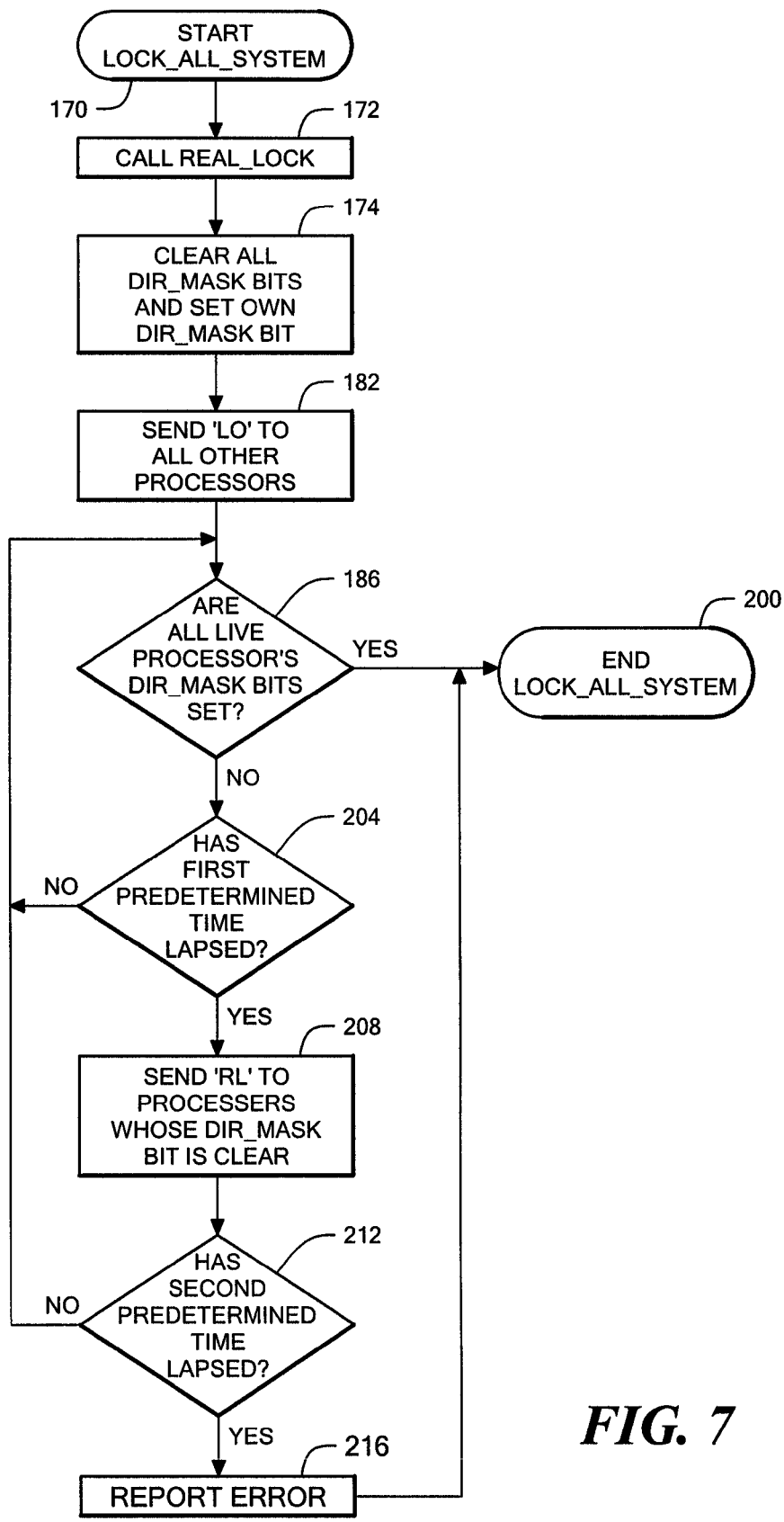
FIG. 7 is a flow diagram illustrating a LOCK_ALL_SYSTEM process implemented by a processor requiring exclusive access to the entire cache.

Referring to FIG. 7, a process, referred to herein as the LOCK_ALL_SYSTEM process or simply the system lock procedure, is executed by a processor when the processor seeks exclusive access to the entire cache (i.e., the system lock). However, by confining use of the LOCK_ALL_SYSTEM procedure to only those operations requiring exclusive access to a large portion of the cache or the entire cache, the efficiencies of tag-based cache management are maintained for other operations in which exclusive access to only a single cache slot is required, which tend to be the majority of operations.

The process commences in block 170, following which the processor calls the REAL_LOCK routine in block 172, which routine is described in conjunction with FIGS. 9-15. Once the processor obtains a lock on the cache according to the REAL_LOCK routine, the DIR_MASK bits associated with all other processors are cleared and the DIR_MASK bit of the processor performing the routine of FIG. 7 is set in block 174. Thus, this block prevents a processor from being denied a lock on the cache by waiting unnecessarily for a GO or GL message from a processor that is not viable for purposes of contending for access to the shared resource (i.e., a "dead" processor). Whether a processor is considered viable (i.e., "live") or dead can be determined by a conventional polling scheme. As one example, in order to be considered a live processor, each processor must update a word in memory, such as the "heartbeat" signal described below in connection with FIG. 14, at a predetermined rate, such as once per second.

In block 182, an LO interrupt message is sent to all of the processors other than the processor performing the routine of FIG. 7 to indicate that the sending processor has obtained a lock on the cache 15. The LO message is not sent to the processor executing the routine of FIG. 7 in order to avoid a deadlock. In block 186, it is determined whether all bits in the DIR_MASK structure corresponding to live processors are set. The DIR_MASK bits of all live processors being set is an indication that the local-lock variable of all other viable processors are set and therefore, that none of the processors has exclusive access to a cache slot. Whereas, if the DIR_MASK bit of a viable processor is not set, then at least one of the live processors has exclusive access to a cache slot. If it is determined in block 186 that all DIR_MASK bits of live processors are set, then the LOCK_ALL_SYSTEM process terminates in block 200, as shown, and the processor can perform the required cache operation having successfully obtained the system lock.

If it is determined that the DIR_MASK bit of all live processors are not set, then certain checks are performed while the processor waits for this condition to occur. In particular, in block 204, it is determined whether or not a first predetermined time has lapsed. Once the first predetermined time has lapsed, an RL interrupt message is sent to the processors whose corresponding bit in the DIR_MASK structure is clear in block 208. The RL message, like the LO message, indicates that the processor has obtained the cache lock and constitutes a second request for a GO or GL message from those processors that have not yet responded. In block 212, it is determined whether or not a second predetermined time has lapsed. Once the second predetermined time has lapsed, an error is reported in block 216, following which the process terminates in block 200. In this way, once the second predetermined time has elapsed without response from one or more of the other processors, it is presumed that there is a fault condition associated with the non-responding processors and the processor is able to terminate the LOCK_ALL_SYSTEM process in block 200. In one illustrative embodiment, the first predetermined time is on the order of 1 second and the second predetermined time is on the order of 2 seconds.

Figure 8:
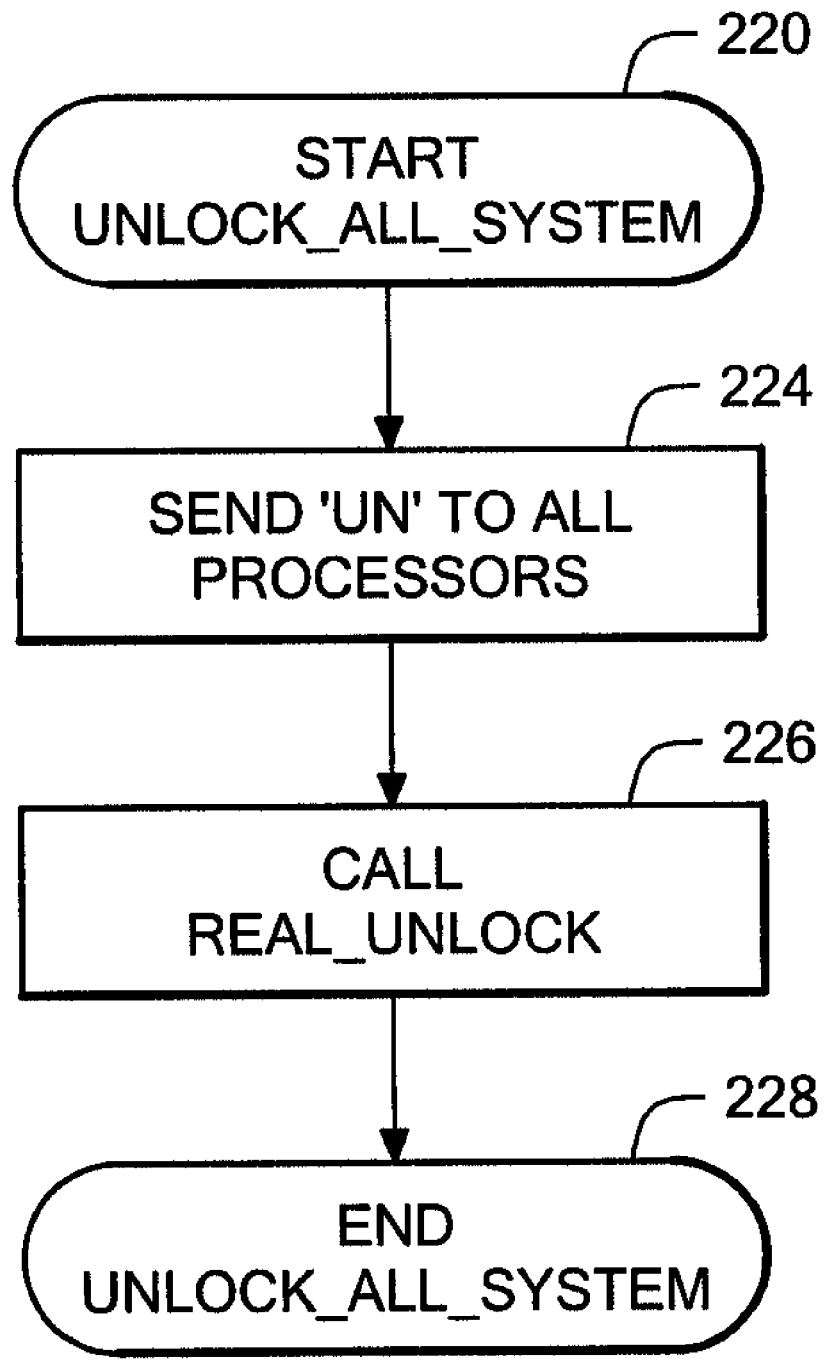
FIG. 8 is a flow diagram illustrating an UNLOCK_ALL_SYSTEM process implemented by a processor that has completed a cache operation requiring exclusive access to the entire cache.

Referring also to FIG. 8, a process, referred to herein as the UNLOCK_ALL_SYSTEM process, is executed by a processor when the processor is ready to relinquish its lock on the cache. The process commences at block 220, following which an UN interrupt message is sent to the other processors, indicating that the processor is relinquishing its lock on the cache. In block 226, the REAL_UNLOCK routine is called in order to update the main lock data structure 230 as described in connection with FIG. 15, following which the process terminates in block 228. With this arrangement, by calling the REAL_LOCK routine before obtaining the system lock in the process of FIG. 7 and of calling the REAL_UNLOCK routine after relinquishing the system lock in the process of FIG. 8, only one processor is able to manipulate the system lock at a time.

Referring now to FIGS. 9 and 10, the data structures used in connection with the REAL_LOCK and REAL_UNLOCK routines referenced in FIGS. 4 and 7 will be described. FIG. 9 is a schematic diagram of a preferred form of the main lock data structure 230, and FIG. 10 is a schematic diagram of a preferred form of the auxiliary lock data structure, 240. MAIN, the main lock data structure, 230, is short enough for an atomic operation and typically has the following form: HOLDER_ID, LOCK_MODE, LOCK_PW, CURRENT_HOLDER, NEXT_FREE. The HOLDER_ID parameter, 231, may be used as an identifier of the requestor which currently holds the cache lock. Each possible requestor in the system is assigned a unique HOLDER_ID. The HOLDER_ID is only updated in connection with certain lock modes, so it may not always identify the current holder of the lock. It is an optional parameter, since it is used primarily to validate the identity of a successful lock requestor.

The LOCK_MODE parameter, 233, specifies the type of lock which is currently being used by the current lock holder. In addition to the basic lock mode procedure associated with a particular LOCK_MODE parameter, one or more supplemental validation procedures, lock override procedures, or both may be selectively associated with each LOCK_MODE parameter. For example, some processor operations take much longer than others, and in systems which implement a preset timeout to override the lock in the event of a protocol failure, it may be desirable to establish a lock mode for these longer operations in which the normal timeout will not occur. Thus, a first lock mode may be associated with a normal timeout lock override procedure and a second lock mode with a different timeout procedure, or none at all. Additional lock modes may be associated, for example, with shared access to certain data. In one embodiment, one of lock modes (and any lock mode, supplemental validation or override procedures associated with this lock mode) will be the default lock mode. In order to illustrate one embodiment, a dual-mode locking system will be described, and the only differences between the two lock modes will be the supplemental validation and lock override procedures associated with them. In the illustrative embodiment, the first lock mode is associated with a competitive, normal timeout lock override procedure and has no supplemental validation procedure, while the second lock mode does have an associated supplemental validation procedure and is also associated with two lock override procedures, one a competitive, long timeout procedure and the other a cooperative, event-based lock override procedure. However, if one byte is allocated to the LOCK_MODE parameter, up to two hundred fifty-six lock modes, with their associated lock mode, supplemental validation and lock override procedures, may be supported within the atomic data structure for MAIN. In the illustrative embodiment, the LOCK_MODE value for a normal timeout mode is the default setting "0" for the LOCK_MODE parameter, while "T" is the LOCK_MODE value for long timeout.

The LOCK_PW parameter, 235, indicates whether a valid lock is held. It has a valid value for the "no lock holder" state, and one or more valid values indicating that the lock is held. All other values are invalid. Each shared resource may be assigned its own value of LOCK_PW, 235. This parameter may be used to identify certain protocol failures requiring lock overrides.

The CURRENT_HOLDER parameter, 237, indicates which place in the lock request queue presently holds the lock. It indicates a place in line, not an identification, but, as will be explained below, it enables the requestor which holds that place in line to determine when it may take the lock. The NEXT_FREE parameter, 239, indicates the next available place in the lock queue. Both CURRENT_HOLDER and NEXT_FREE are numeric parameters whose values wrap so that the allowable size of the parameter is never exceeded.

AUX, 240, the auxiliary lock data structure, may be a single entry, the entry being a single atomic structure, or it may be an array which includes an entry for each processor, each entry being a single atomic structure. AUX, 240 typically has the following form: MY_ID (optional), LOCK_MODE_AUX, MY_NUMBER_AUX, TIME_STAMP_AUX(optional). In the embodiment described herein, AUX is implemented as an array that includes a plurality of entries, with each entry represented by the structure of FIG. 10 and corresponding to a respective processor.

Since the auxiliary lock data structure, 240, is used primarily to assist in determining when a protocol failure requiring certain lock override procedures has occurred, it is typically not updated every time a new requestor takes the lock. This feature will be further described in connection with FIG. 13.

The MY_ID parameter, 241, is an identifier uniquely associated with each processor. As will be further discussed below, the entry is typically refreshed only when that processor is the requestor which currently holds the lock, and only in connection with certain lock modes. In the array form of AUX, each entry within the array has only one valid value of MY_ID, which is the value that identifies the processor associated with the particular entry. For example, in the array entry corresponding to processor 1a, the only valid value for MY_ID is the identifier of processor 1a. In a single entry form of AUX, N different values of MY_ID are valid, one being associated with each of the N possible requesters. This parameter is optional, but may be used for validation in certain protocol failure situations, as further explained below.

The LOCK_MODE_AUX parameter, 243, specifies the type of lock which is currently being used by the current lock holder. It has the same possible values and serves the same purpose as the LOCK_MODE parameter, 233.

The MY_NUMBER_AUX parameter, 245, indicates what place in the queue the processor holds. The entry is typically refreshed only in connection with certain lock modes by a requestor which holds the lock in that mode. In the array form of AUX, each processor may refresh only the value in its own entry in the array.

The TIME_STAMP_AUX parameter, 247, indicates the time at which the processor making the entry obtained the lock. It is typically used to start a timeout clock. This parameter is optional, but may be used for certain types of lock overrides, as will be further explained below.

In addition to MAIN, 230, and AUX, 240, which must be stored in shared memory, 2, so that all possible requestors may access them, two additional numerical variables, MY_NUMBER, 51a-n, and TIME_STAMP_L, 53a-n, are associated with each potential requester. While these may be stored in any system resource to which the requester has access, typically, both MY_NUMBER, 51i, and TIME_STAMP_L, 53i, are stored in the local memory associated with each potential requester in order to reduce bus traffic. Each requester also requires sufficient local memory to store the two most recent values of MAIN and the value of an AUX entry.

Figure 11:
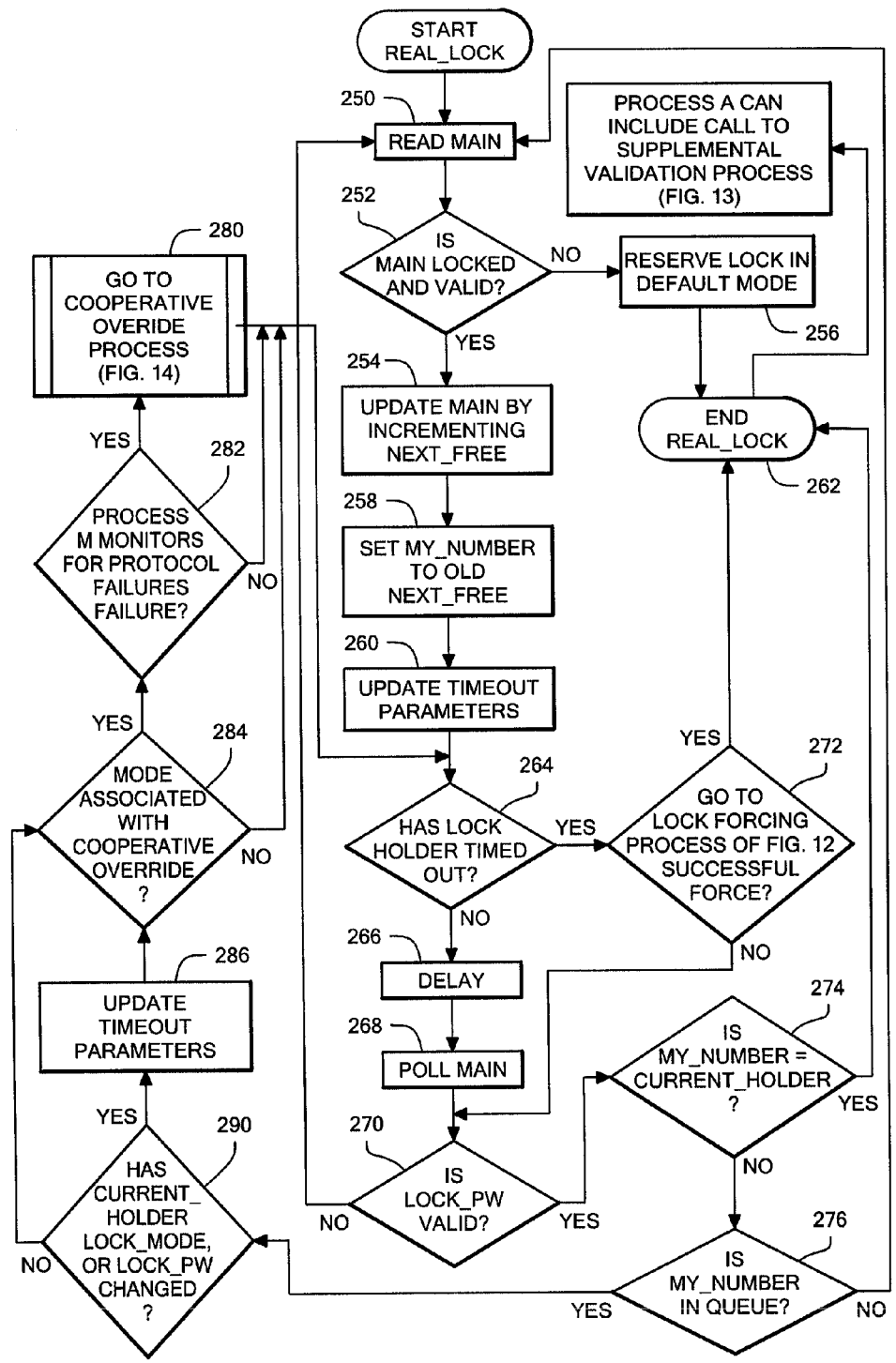
FIG. 11 is a flow diagram illustrating the REAL_LOCK process including blocks used to enter the lock request queue, and to poll for and obtain a lock on the entire cache.

Turning now FIG. 11, the REAL_LOCK routine that includes blocks used to enter the lock request queue, and to poll for and obtain the lock during normal operation of the system described herein are illustrated in a flowchart. Prior to entering the process described in FIG. 11, processor 1a has, in the course of executing process A, identified a need to obtain a lock on a shared resource 4, illustratively, the cache. In a single atomic read-modify-write operation, represented on the flowchart by blocks 250, 252, 254, and 256, processor 1a initiates its attempt to obtain the lock. In block 250, processor 1a reads MAIN, and in block 252, determines whether the lock is validly held. If the lock is currently held by another requester, the LOCK_PW, 235, will have a valid value indicating that the lock is held.

If this condition is not true, processor 1a will reserve the lock in default mode and establish a lock request queue at block 256 by setting HOLDER_ID, 231 to its own value, LOCK_MODE, 233 to "0", LOCK_PW, 235, to a valid value, CURRENT_HOLDER, 237, to the value presently entered in NEXT_FREE, 239, and by incrementing NEXT_FREE, 239. Next, at block 262, processor 1a makes a good exit to process A (i.e., the REAL_LOCK routine ends). Processor 1a may call the supplemental validation process described in connection with FIG. 13, either immediately upon completing block 256, if it requires the lock in a mode other than the default mode, or at some later point in its execution of process A, if, for example, an error or branch condition creates the need for an alternate activity, like recovering the structure of the shared resource, which would require the alternate lock mode.

Assuming that the lock is validly held by another processor, processor 1a queues for the lock in a single atomic read-modify-write operation represented in FIG. 11 by blocks 250, 252 and 254. If upon reading MAIN in block 250, processor 1a determines that the lock is validly held by another requester by the method previously described in connection with block 252, then, at block 254, processor 1a will reserve the next available number in the queue by incrementing the value of NEXT_FREE in MAIN. At block 258, processor 1a enters the queue by setting the value of MY_NUMBER, 51a, to the value of NEXT_FREE it read in block 252.

The processor then updates the timeout parameters at block 260, assuming the lock mode it detected in block 250 by reading MAIN has a timeout-based lock override procedure associated with it in lock services procedure 6. If there is no timeout-based lock override procedure associated with the lock mode, then processor 1a may jump directly to the lock polling sequence beginning at block 266. In the exemplary embodiment shown in FIG. 11, there is a timeout-based lock override procedure associated with each of the two possible lock modes, so at block 260, processor 1a updates in its local memory the override parameters associated with the lock mode it has found to be in effect. Each lock mode which has an associated timeout procedure may use a different source for its reference value and a different predetermined interval associated with it in lock services procedure 6. Thus, for example, the normal timeout mode may use obtain its reference value from its own clock and have a timeout interval of a few seconds or less, while the long timeout mode may obtain its reference value from AUX, 240, and have a timeout interval of many minutes. So, in one embodiment, processor 1a performs the update by saving the time at which block 258 occurs (as measured by its own internal clock) in TIME_STAMP_L for use as a reference value in monitoring whether a timeout has occurred. In this approach, the timeout is established and monitored without involving scarce system resources such as the busses in any additional I/O cycles, so it is suitable for use as the lock override procedure corresponding to the default lock mode. In another embodiment, processor 1a may perform this update by taking a timestamp value from TIME_STAMP_AUX, 247 for use as a reference value in monitoring whether a timeout has occurred. In the described embodiment, in which AUX is an array, processor 1a determines what entry in AUX to use for this purpose from the value of HOLDER_ID, 231, which processor 1a read in MAIN, 230, at block 250. For validation, processor 1a may confirm that its LOCK_MODE_AUX is set to the second lock mode, and, if MY_ID is implemented, may confirm that AUX also has a value of MY_ID corresponding to the value of HOLDER_ID. If, when processor 1a executes these validation blocks, AUX is found not to be valid, processor 1a may default to a short, fixed, timeout value. If a valid AUX entry is found, processor 1a will save the time from TIME_STAMP_AUX to the processor's local memory, for example in TIME-STAMP_L for use in monitoring whether a timeout has occurred. In this embodiment, several additional I/O cycles involving scarce system resources are required to validate the lock mode and establish the reference value for the timeout, so this approach is most suitable when either the timeout procedure itself or the lock mode procedure it is associated with (or both) are expected to consume many more I/O cycles or system resources than the default lock mode. In this situation, the small number of I/O cycles used may be justified by decreased likelihood that one or both of these procedures will be initiated in error.

Assuming that a timeout-based lock override has been determined to be associated with operative lock mode, in block 264, processor 1a will continue with the procedure by testing to see if a timeout has occurred by determining whether the predetermined interval has elapsed since the reference value for the timeout was updated. If a timeout is detected, at block 272, processor 1a enters the lock forcing process further described in connection with FIG. 12. If a timeout has not occurred, processor 1a begins polling MAIN. In one embodiment, at block 266, processor 1a estimates, before every repetition of polling block 268, the number of prior entries in the lock request queue and adaptively delays its polling period as a function of the number of prior entries in the lock request queue. The polling period may be estimated as the product of the number of significant processor operations expected to be performed before processor 1a obtains the lock as a function of the number of prior entries in the lock request queue and the average duration of a significant processor operation involving the shared resource. This delay procedure is further described in U.S. Ser. No. 09/312,146 filed 14 May 1999 by Ofer et al and entitled "Adaptive Delay of Polling Frequencies in a Distributed System with a Queued Lock", now U.S. Pat. No. 6,353,869 B1, which is herein incorporated by reference in its entirety.

After polling MAIN in block 268, processor 1a performs a sequence of sanity checks on the updated value of MAIN, 230, which it has obtained from the polling block, 268, and stored in its local memory. The sanity check sequence may also be entered from the lock forcing process of block 272 after a failed attempt to force the lock. If processor 1a determines at block 270 that the LOCK_PW, 235, is invalid, processor 1a will jump to block 250 and attempt to obtain the lock. If the LOCK_PW, 235, is valid and processor 1a finds at block 274 that it has obtained the lock, i.e. that the value of CURRENT_HOLDER, 237, read at block 268 equals MY_NUMBER, 51a, the process terminates at block 262. If upon reading MAIN, 230, in block 268, processor 1a determines at block 270 that the LOCK_PW, 235, is valid and at block 274 that the lock is still held by another requestor by the method previously described in connection with block 252, then, at block 276, processor 1a compares MY_NUMBER with CURRENT_HOLDER and NEXT_FREE to determine whether processor 1a is still in the queue. If, when adjusted for the queue wrap, MY_NUMBER is not between CURRENT_HOLDER and NEXT_FREE, this indicates that the lock has been reset due to a lock override, as will be described further in connection with FIG. 12, and processor 1a is not a member of the current queue of lock requesters. Processor 1a then goes to block 250 and repeats blocks 250, 252, 254, and 258 in order to join the new lock queue. If block 276 confirms that processor 1a is still part of the current lock request queue, then, as will be further discussed in connection with the lock override procedures described below, at block 290 processor 1a will determine if CURRENT_HOLDER, 237, LOCK_MODE, 233, or LOCK_PW, 235 has changed. At block 286, processor 1a may update its timeout parameters if any of these has changed since its last reading of MAIN.

In one embodiment, each processor implements a monitoring procedure, M, for detecting a predetermined indication of protocol failure by an one of the plurality of processors and identifying the failing processor. This procedure, M, is external to the REAL_LOCK procedure, but may be used to trigger certain lock override procedures, for example, the cooperative lock override process described in connection with FIG. 14. In one embodiment, shown in FIG. 11, processor 1a will determine at block 284 whether the lockholder is operating in a lock mode associated with an override which uses this trigger, such as the cooperative lock override, and if the lockholder is, process M may be periodically polled by processor 1a. Upon receiving an indication of protocol failure during this poll, processor 1a will initiate a lock override process at block 280, as further described in connection with FIG. 14. At the conclusion of the process shown at block 280, there will typically be a new lockholder, and processor 1a will go to block 264 to continue checking for timeouts. Alternatively, procedure M may cause a jump to a lock override process at block 280, as further described in connection with FIG. 14. The procedure M is shown for convenience operating at block 282 although it will be understood that it operates periodically so long as the processors are running. In a preferred embodiment, the polls do not occur when the lockholder is operating in the default lock mode, but only in connection with a more resource-intensive lock mode such as the long timeout mode. However, in an alternative embodiment, polls of or jumps to and from process M may occur at any time in the course of the REAL_LOCK procedure.

If processor 1a determines that the present lock mode is not associated with process M at block 284, or if no protocol failure is indicated by process M in block 282, processor 1a will continue checking for timeouts at block 264. So long as processor 1a does not obtain the lock and no lock override is initiated as described below in connection with FIG. 12 or FIG. 14, processor 1a repeats the applicable blocks in the lock polling sequence, 264 through 268, and (with blocks 284, 282, and 280 if the lock mode so requires), until it determines either that LOCK_PW, 235, has an invalid value or that MY_NUMBER, 51a, equals CURRENT_HOLDER, 237, either of which cause it to take the lock and terminate the REAL_LOCK process, as described in blocks 256 and 262, or it determines that a timeout or other event requiring a lock override has occurred. Various procedures for handling lock overrides are discussed in connection with FIGS. 12, 13, and 14.

Figure 12:
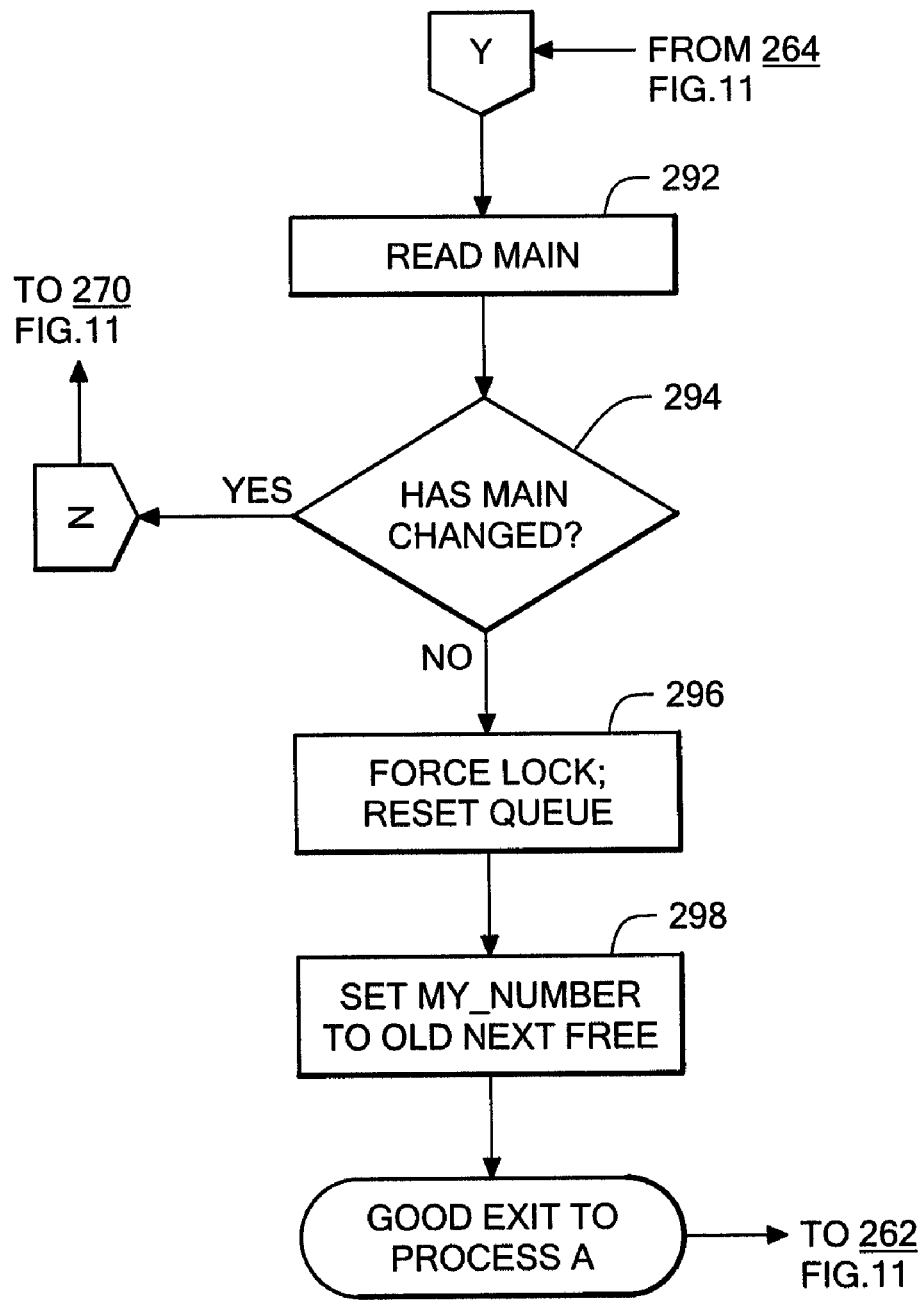
FIG. 12 is a flow diagram illustrating blocks used to perform a timeout lock override procedure associated with a selected one of the lock modes during the REAL_LOCK process of FIG. 11.

FIG. 12 is a flowchart illustrating blocks used to perform a lock override procedure associated with a selected one of the lock modes in the system described herein. This lock override procedure is a timeout procedure. Different timeout procedures with different reference values and timeout intervals may be associated with different lock modes. In the exemplary embodiment, for example, a normal, i.e. short, timeout interval using a first reference value is associated with the default "0" lock mode and a long timeout interval using second reference value is associated with the other "T" lock mode. Referring now to block 264 in FIG. 11, processor 1a tests to see if a timeout has occurred by determining whether a predetermined interval has elapsed since the reference value for the timeout. If a timeout has occurred, processor 1a enters the lock forcing process of block 272. Going now to FIG. 12, where the process of 272 is illustrated in more detail, if processor 1a determines that a timeout has occurred, then, entering the lock forcing process at Y, in a single atomic read-modify-write operation, represented on the flowchart by blocks 292, 294, and 296, processor 1a initiates its attempt to obtain the lock. At block 292, processor 1a will read MAIN, 230, and at block 294 will determine whether MAIN, 230, has changed since processor 1a last read MAIN and stored its value in local memory. If it has not, at block 296, processor 1a will force the lock, and reset the entire lock request queue, by setting CURRENT_HOLDER, 237, equal to value of NEXT_FREE, 239, it read in block 292, incrementing NEXT_FREE, setting the LOCK_MODE, 233, to the default mode indicator (regardless of which lock mode processor 1a actually requires), setting HOLDER_ID, 231, to its own identifier and setting the LOCK_PW, 235, to a valid password. Blocks 292, 294, and 296 must be performed as an atomic operation. At block 298, processor 1a will complete the lock override procedure by setting MY_NUMBER, 51a, equal to the value of NEXT_FREE 239 it read in block 292. Processor 1a will then make a good exit to process A and the REAL_LOCK routine is completed. As discussed in connection with block 262 in FIG. 11, should processor 1a require the lock in some mode other than the default mode, it will, as a part of this process, proceed as described in connection with FIG. 13. Otherwise, it will simply take the lock and exit the REAL_LOCK procedure.

If more than one processor is in the lock request queue when the first mode timeout occurs, it is possible that more than one processor will detect the event and attempt to force the lock. It would be undesirable for more than one processor to do so successfully. So, if processor 1a detects in block 294 that MAIN, 230, has changed since the last time processor 1a polled MAIN, it will end the atomic operation without changing MAIN at Z and exit the forcing procedure. It will then continue with the sanity check sequence described in connection with FIG. 11, beginning with block 270, if implemented, using the new value of MAIN which it read at block 292, and proceeding to blocks 274 and beyond. Typically, in this scenario, processor 1a will detect in block 276 that the lock request queue has been reset, and will then repeat blocks 250, 252, 254, and 258 in order to join the new lock queue. If processor 1a has not detected the timeout before the lock is forced, and so never enters the lock forcing process, then when processor 1a reaches block 276 in its regular polling sequence, it will detect that MY_NUMBER, 51a, is no longer in the queue and will also repeat blocks 250, 252, 254, and 258 in order to join the new lock queue.

Figure 13:
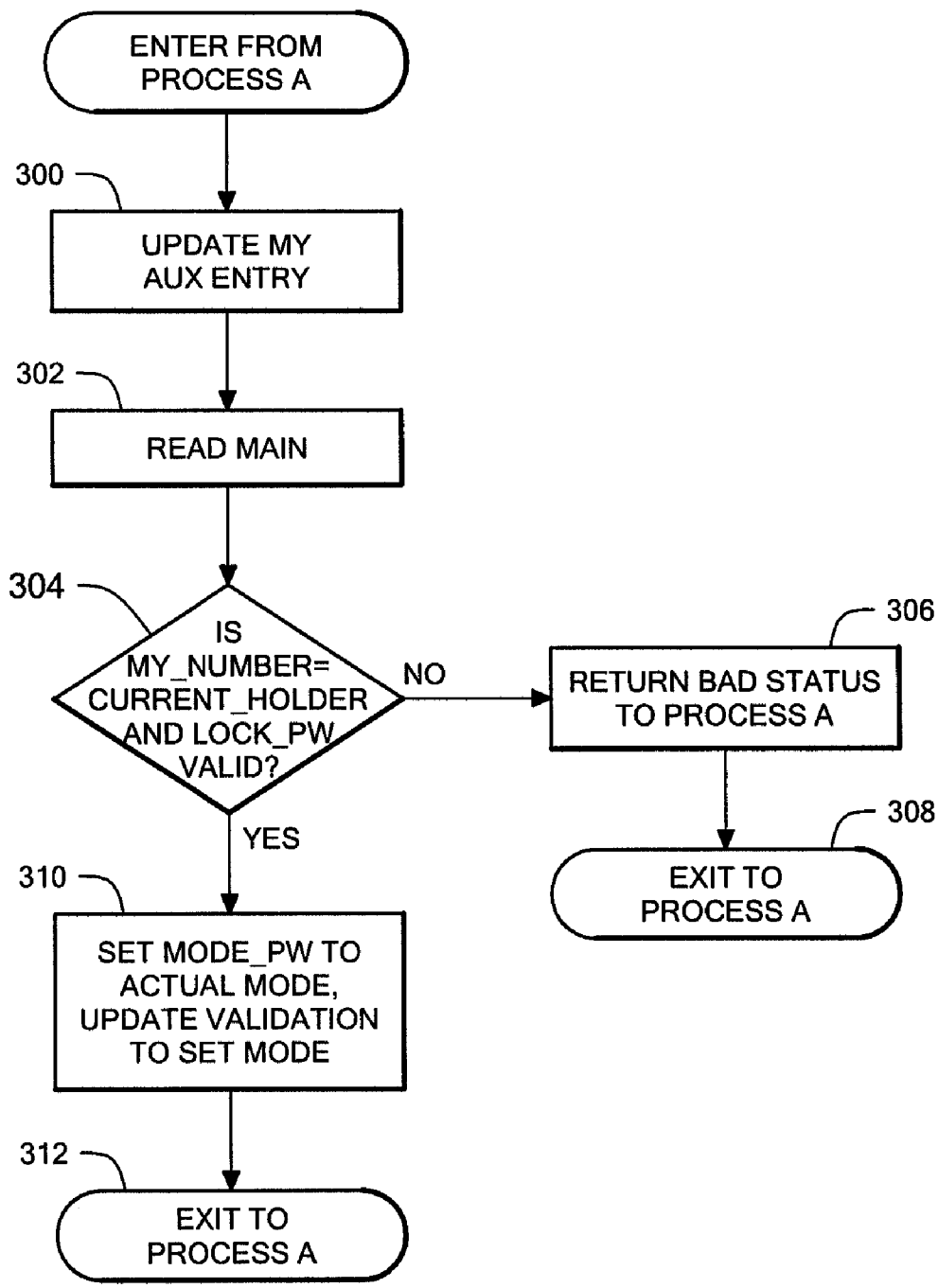
FIG. 13 is a flow diagram illustrating blocks used to take the lock, to select one of the lock modes, to perform a supplemental validation associated with the selected lock mode, and to initialize a cooperative lock override procedure associated with the selected lock mode of FIG. 11.
Figure 14:
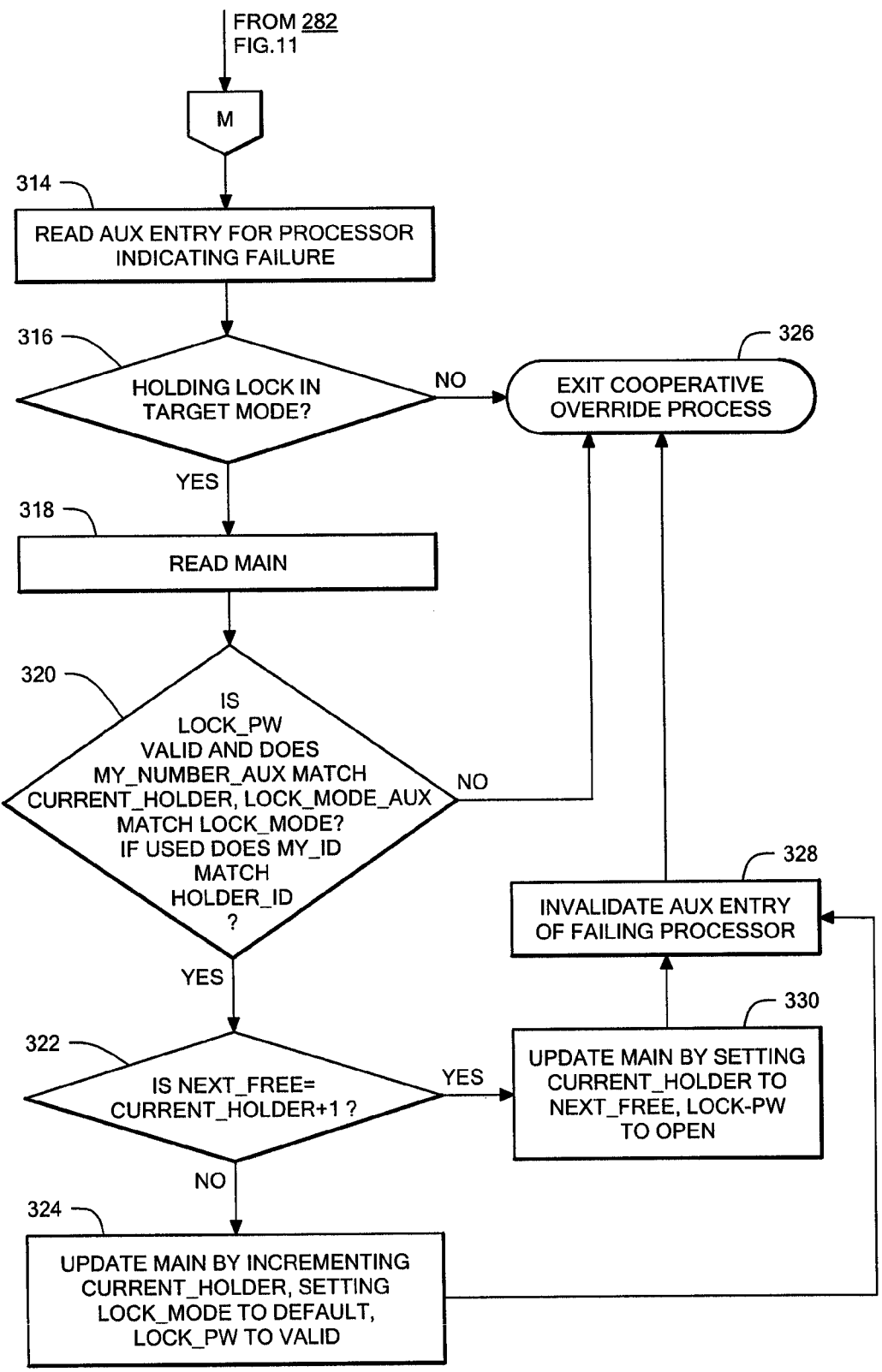
FIG. 14 is a flow diagram illustrating blocks used to perform the cooperative lock override procedure corresponding to a selected one of the lock modes during the REAL_LOCK process of FIG. 11.

FIG. 13 is a flowchart illustrating blocks used to select a lock mode (in this case, the second lock mode) other than the default lock mode, to perform a supplemental validation associated with the selected lock mode, and to initialize a second lock override procedure associated with the selected lock mode. FIG. 14 will describe how the second lock override procedure is performed. The second lock override procedure is a cooperative lock override procedure, and, for purposes of illustration, will be associated with the second, or long timeout lock mode. Because it involves a number of blocks using scarce system resources, the cooperative lock override procedure is most suitably associated with a lock mode expected to consume many more I/O cycles or system resources than the default lock mode. To minimize the likelihood of tying up these system resources in error, a supplemental validation procedure is selectively associated with this lock mode. For purposes of this discussion and the one that follows in connection with FIG. 15, it will be assumed that processor 1a has queued for the lock and determined in block 274 of FIG. 11 that its MY_NUMBER, 51a, corresponds to CURRENT_HOLDER, 237. Processor 1a has therefore made a good exit to process A at block 262. It will also be assumed that processor 1f is next in the lock request queue.

Turning now to FIG. 13, where the supplemental validation process is described in more detail, processor 1a calls the supplemental validation process from process A, as discussed in connection with block 262 of FIG. 11, because it needs an alternate mode for which supplemental validation is associated, in this case the long timeout mode. In block 300, processor 1a updates AUX, 240 by setting LOCK_MODE_AUX, 243, to the identifier of the lock mode it requires, in this case the identifier, "T", for long timeout mode, and MY_NUMBER_AUX, 245, to MY_NUMBER, 51a, the number of its place in the queue. In the illustrated embodiment in which AUX is an array, processor 1a will update only the values in its own entry AUX(a). It should be noted that TIME_STAMP_AUX, 247, and MY_ID, 241, are not required parameters in connection with the second lock override procedure illustrated in FIG. 13, although either or both may optionally be used for validation in connection with this procedure. If a timeout is associated with the selected lock mode, or if TIME_STAMP_AUX, 247, is to be used for validation, processor 1a will also update TIME_STAMP_AUX, 247, to the time at which block 300 occurs, and if MY_ID, 241, is implemented in AUX, will update MY_ID to the value of its unique identifier. It is not necessary to implement a timeout in addition to the cooperative lock override procedure described below in connection with any selected mode, but depending on the events used to trigger the cooperative lock override procedure, it may be desirable to do so. In the illustrative embodiment, as will be discussed in connection with FIG. 14, both an event-based cooperative lock override procedure and a timeout-based lock override procedure are associated with the long timeout mode. Typically, if both are implemented, processor 1a reads an internal clock, preferably the system clock, to determine the time at which block 300 occurred and puts this value in TIME_STAMP_AUX, 247. In an atomic read-modify-write operation shown as blocks 302, 304, and 310, processor 1a then reads MAIN, 230, at block 302 and determines at block 304 whether it validly holds the lock by determining whether MY_NUMBER, 51a, is equal to CURRENT_HOLDER and the LOCK_PW, 235, has a valid value. Since processor 1a has just taken the lock, in the absence of a memory corruption involving MAIN, 230, or other protocol error, this operation is expected confirm its custody of the lock. Upon receiving confirmation that it still holds the lock and still as part of the atomic operation begun in block 302, processor 1a updates MAIN, 230, in block 310 by setting LOCK_MODE, 233, to the mode indicator "T", and updating the validation parameters implemented in MAIN. Processor 1a then exits the supplemental validation process at 312 and proceeds with process A. If any confirmation block in the sequence fails to confirm that processor 1a holds the lock, then processor 1a gives a "bad status" error message to process A at block 306 and exits the lock contention process to process A at block 308, ending the atomic operation without changing MAIN as it does so. Although each confirmation requires an extra bus cycle, any failure to confirm is strong evidence of a protocol violation involving processor holding the lock or the lock itself. Once a resource is locked into a long timeout mode (or another high I/O demand mode) in error, detecting and correcting the problem typically requires a great many bus cycles to correct. The validation blocks significantly decrease the likelihood of such errors.

The processes indicated at blocks 282 and 280 of FIG. 11 will now be described in more detail. Turning now to FIG. 14, the second lock override procedure is initiated at M when any processor detects certain types of protocol failures while the processor which hold the lock is operating in a lock mode associated with the second lock override procedure, by way of example, the long timeout mode. The detecting processor need not be a current member of the lock request queue, and may, in some instances, even be the one which holds the lock. In one aspect, the second lock override procedure may be initiated when a processor receives a predetermined indication from a process M external to the lock services procedure that another processor is malfunctioning. For example, in the SYMMETRIX®. storage systems manufactured by EMC Corporation, the processors monitor certain of their own functions. If a processor detects certain types of malfunctions, it will put a message in a first predetermined area in global memory indicating that it is malfunctioning. All processors periodically poll this area for indications of malfunctions in the other processors. In addition, each processor periodically sends a signal, called a heartbeat, over the common bus to a predetermined area in global memory to indicate that it is in good working order, and all processors monitor the heartbeats of all other processors by polling for these heartbeats. If the polling processor fails to detect the heartbeat of another processor for a predetermined interval, the polling processor determines that the silent processor has malfunctioned. A processor may even trigger this override on itself as lockholder if it receives an indication, for example, from process A, that it may have failed to clear the lock in a previous operation. Other events can also be used to trigger the cooperative override procedure.

At block 282 in FIG. 11, processor 1c detects a malfunction in processor 1a via process M and enters the cooperative override process shown at block 280 in FIG. 11. At block 314, processor 1c reads AUX(a) corresponding to processor 1a. At block 316, processor 1c determines whether processor 1a had set its LOCK_MODE_AUX entry, 243, to indicate a mode associated with the cooperative lock override procedure, in our example, the long timeout mode. The value of MY_NUMBER_AUX, 245, in AUX, 240, indicates what place in the queue a processor held the last time it updated AUX. However, since each processor updates its entry in AUX only when it requires a long timeout mode and corruption of the data in the interim periods is possible, it is desirable to validate AUX, 240, using either the time in TIME_STAMP_AUX, 247, or the processor identifier in MY_ID, 241, or both. If the entry is corrupt, it is unlikely that MY_ID will contain the proper identifier and if the entry is outdated, the time in TIME_STAMP_AUX(a) will so indicate. Since each entry in the AUX array is atomic, all of the reads necessary for validation require only one bus I/O cycle. If AUX is not validated or does include the indicator for the long timeout mode, the second lock override procedure will not be implemented, and processor 1c will exit the sequence at 326. If AUX indicates that processor 1a held the lock in long timeout mode, and the requisite validation criteria are satisfied, then at block 318, processor 1c reads MAIN, 230, and at block 320 attempts to validate that processor 1a held the lock in long timeout mode. If MAIN, 230 is not validated or does include the requisite indicators for the long timeout mode, the second lock override procedure will not be implemented, and, as before, processor 1c will exit the sequence at 326. If processor 1c is not queued for the lock, at 326 it will exit the lock contention procedure, but if processor 1c is a member of the lock request queue, from 326 it will continue the lock polling sequence at block 264 in FIG. 11. If at block 320, processor 1c does validate that processor 1a held the lock in long timeout mode by finding that CURRENT_HOLDER, 237, has the same value as the value of MY_NUMBER_AUX, 245, which processor 1a read in block 314, that LOCK_MODE, 233, is set to indicate the long timeout mode, and that LOCK_PW, 235, and HOLDER_ID, 231, if implemented, validate that processor 1a holds the lock, then at block 322, processor 1c determines whether the value of NEXT_FREE, 239, read at block 318 is equal to CURRENT_HOLDER, 237, plus 1. If it is, there is no other requester in the queue, so at block 330, processor 1c updates MAIN to indicate the lock is not held by setting CURRENT_HOLDER, 237, equal to the value of NEXT_FREE, 239, setting the LOCK_MODE, 233, to its default value and setting the LOCK_PW, 235, to indicate "no lock holder". If NEXT_FREE, 239, is not equal to CURRENT_HOLDER, 237, plus 1, there are other requestors in the lock queue, so at block 324, processor 1c updates MAIN, 230, by incrementing CURRENT_HOLDER, 237, setting LOCK_MODE, 233 to its default value and setting the LOCK_PW, 235, to any valid value. Following block 330 or 324, at block 328, processor 1c invalidates the AUX entry of processor 1a, 240, by writing over at least MY_ID, 241, and preferably the entire entry, and then exits the cooperative lock override procedure at block 326, as described above. Meanwhile, the processors in the lock request queue will continue with the lock polling sequence described in connection with FIG. 11. Processor 1f, the lock requestor which has been moved to the head of the queue by processor 1c will detect on its next poll that the LOCK_PW, 235, is valid and that MY_NUMBER, 51c, is now equal to CURRENT_HOLDER, 237, and will accept the lock.

Figure 15:
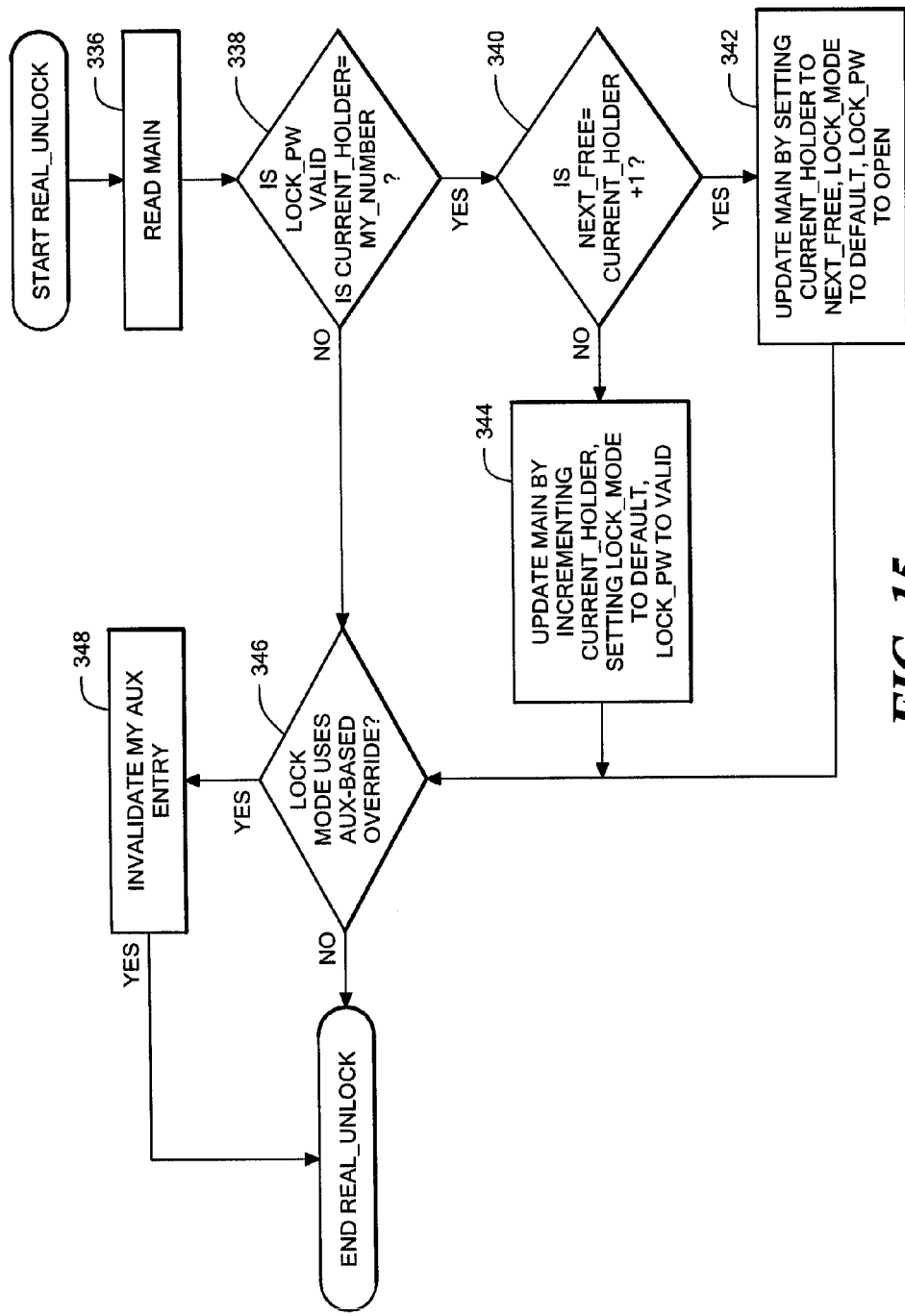
FIG. 15 is a flow diagram illustrating the REAL_UNLOCK process.

Turning now to FIG. 15, the REAL_UNLOCK procedure for relinquishing the lock in the absence of a protocol error is shown. As indicated above in connection with FIG. 14, it will be assumed that processor 1a holds the lock in long timeout mode and processor 1f is the next requestor in the queue. Except where indicated, the blocks are the same regardless of whether processor 1a held the lock in default mode or in another mode. It will also be assumed that processor 1a has successfully completed the portion of process A which required a lock on the shared resource 4 and still retains the lock, i.e. that no other processor has completed a lock override procedure. At block 326, processor 1a reads MAIN, 230, and at block 338 determines whether MAIN is valid and whether the value of CURRENT_HOLDER, 237, read at block 336 is equal to the value of MY_NUMBER, 51a. If both conditions are satisfied, then at block 340, processor 1a determines whether the value of NEXT_FREE, 239, read at block 336 is equal to CURRENT_HOLDER, 237, plus 1. If it is, there is no other requester in the queue, so at block 342, processor 1a updates MAIN to indicate the lock is not held by setting CURRENT_HOLDER, 237, equal to the value of NEXT_FREE, 239, setting the LOCK_MODE, 233, to its default value and setting the LOCK_PW, 235, to indicate "no lock holder". If NEXT_FREE, 239, is not equal to CURRENT_HOLDER, 237, plus 1, there are other requesters in the lock queue, so at block 344, processor 1a updates MAIN, 230, by incrementing CURRENT_HOLDER, 237, setting LOCK_MODE, 233 to its default value and setting the LOCK_PW,

235, to any valid value. These blocks are performed as an atomic read-modify-write operation. Following block 342 or 344, or following block 338 if either of the conditions are not satisfied, processor 1a decides, at block 346 if it held the lock in a lock mode associated with a lock override procedure which requires a reference to AUX, 240, such as the cooperative lock override procedure described in connection with FIG. 14, or a timeout-based procedure which uses TIME_STAMP_AUX, 247, as its reference value. If it did not hold the lock in such a mode, it will exit the lock services procedure, 6a, to resume process A. However, in the exemplary embodiment, processor 1a held the lock in long timeout mode, which is associated with both the cooperative lock override procedure and a timeout procedure which uses TIME_STAMP_AUX, 247, as its reference value, so at block 348, processor 1a invalidates the AUX entry of processor 1a by writing over at least MY_ID, and preferably the entire entry, and then exits the lock services procedure to resume process A. Meanwhile, processor 1f, continuing with the lock contention procedure of FIG. 11, will shortly discover at block 274 that CURRENT_HOLDER, 237, is now equal to MY_NUMBER, 51f, and so, in normal operation, the lock will pass to the next member of the queue.

Having described the preferred embodiments of the invention, it will now become apparent to one of ordinary skill in the art that other embodiments incorporating their concepts may be used.

It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method for controlling exclusive access to a resource shared by a plurality of processors in a data storage system, comprising:
    providing for each processor a system lock procedure to permit a processor executing the system lock procedure to obtain a lock on the shared resource preventing other processors from accessing the shared resource; and
    providing for each processor a faked lock procedure to indicate to the system lock procedure that a processor executing the faked lock procedure has a lock on the shared resource where such a lock does not exist, and wherein the faked lock procedure does not prevent other processors from accessing the shared resource.

2. The method of claim 1 wherein the shared resource is a cache.

3. The method of claim 2 wherein the system lock procedure permits a processor to obtain a lock on the entire cache.

4. The method of claim 1 wherein the system lock procedure comprises:
    maintaining a data structure indicative of whether any of the other processors has a lock on a portion of the shared resource; and
    obtaining a lock on the shared resource in response to the data structure indicating that none of the other processors has a lock on a portion of the shared resource.

5. The method of claim 4 wherein the system lock procedure further comprises sending a status request message to the other processors to request the lock status of the other processors.

6. The method of claim 5 further comprising waiting for a predetermined duration to obtain the lock on the shared resource in response to the data structure indicating that at least one of the other processors has a lock on a portion of the shared resource.

7. The method of claim 6 further comprising sending a second request in the form of a second status request message to any of the other processors that did not respond to the status request message during the predetermined duration.

8. The method of claim 6 further comprising obtaining the lock on the shared resource in response to the predetermined duration lapsing.

9. The method of claim 1 wherein the faked lock procedure comprises:
    maintaining a global-lock variable indicative of whether or not another processor has a lock on the shared resource; and
    preventing another processor from obtaining exclusive access to the shared resource in response to the global-lock variable indicating that none of the other processors has a lock on the shared resource.

10. The method of claim 9 further comprising repeatedly obtaining and relinquishing a lock on the shared resource in response to the global-lock variable indicating that at least one of the other processors has a lock on the shared resource.

11. The method of claim 10 further comprising preventing another processor from obtaining the lock on the shared resource in response to repeatedly obtaining and relinquishing a lock on the shared resource a predetermined number of times.

12. The method of claim 1 further comprising providing for each processor a monitoring procedure for detecting a predetermined indication of protocol failure by any one of the plurality of processors and identifying the failing processor and a lock override procedure responsive to the detection of the predetermined indication of protocol failure.

13. A data storage system comprising:
    a shared resource;
    a plurality of processors coupled to the shared resource through a communication channel; and
    a lock services procedure implemented in each of the processors and comprising a system lock procedure to permit a processor executing the lock services procedure to obtain a lock on a shared resource preventing other processors from accessing the shared resource and a faked lock procedure to indicate to the system lock procedure a lock on the shared resource by the processor where such a lock does not exist and wherein the faked lock procedure does not prevent other processors from accessing the shared resource.

14. The data storage system of claim 13 wherein the shared resource is a cache.

15. The data storage system of claim 13 wherein each processor is operable, in accordance with the system lock procedure, to maintain a data structure indicative of whether any of the other processors has a lock on a portion of the shared resource and to obtain a lock on the shared resource in response to the data structure indicating that none of the other processors has a lock on a portion of the shared resource.

16. The data storage system of claim 13 wherein each processor is operable, in accordance with the faked lock procedure, to maintain a global-lock variable indicative of whether or not another processor has a lock on the shared resource and to prevent other processors from obtaining exclusive access to the shared resource in response to the global-lock variable indicating that none of the other processors has a lock on the shared resource.

17. The data storage system of claim 13 wherein each processor is operable to implement a monitoring procedure for detecting a predetermined indication of protocol failure by any one of the plurality of processors and identifying the failing processor and to implement a cooperative lock override procedure responsive to the detection of the predetermined indication of protocol failure.

18. A method for controlling exclusive access to a resource shared by a plurality of processors in a data storage system, comprising:
  permitting a lock seeking processor to obtain a lock on the shared resource preventing other processors from accessing the shared resource; and
  falsely indicating to the lock seeking processor that another processor seeking to change a state of a portion of the shared resource has a lock on the shared resource to prevent the lock seeking processor from obtaining the lock on the shared resource.

19. The method of claim 18 wherein the shared resource is a cache and the portion of the shared resource is a cache slot.

20. The method of claim 18 wherein permitting includes:
  maintaining a data structure indicative of whether any of the other processors has a lock on a portion of the shared resource; and
  obtaining a lock on the shared resource in response to the data structure indicating that none of the other processors has a lock on a portion of the shared resource.

21. The method of claim 18 wherein falsely indicating includes:
  maintaining a global-lock variable indicative of whether or not another processor has a lock on the shared resource; and
  preventing another processor from obtaining exclusive access to the shared resource in response to the global-lock variable indicating that none of the other processors has a lock on the shared resource.

* * * * *

UNITED STATES PATENT AND TRADEMARK OFFICE
CERTIFICATE OF CORRECTION

PATENT NO.        : 7,246,187 B1
APPLICATION NO.   : 10/955033
DATED             : July 17, 2007
INVENTOR(S)       : Ezra et al.

It is certified that error appears in the above-identified patent and that said Letters Patent is hereby corrected as shown below:

Column 7, line 7, delete "in order illustrate" and replace with -- in order to illustrate --.

Column 10, line 17, delete "cached." and replace with -- cache. --.

Column 14, line 23, delete ", one of lock" and replace with --, one of the lock --.

Column 15, line 54, delete "now FIG. 11," and replace with -- now to FIG.11, --.

Column 16, line 45, delete "may use obtain" and replace with -- may obtain --.

Column 18, line 11, delete "by an one of" and replace with -- by any one of --.

Column 20, line 52, delete "expected confirm" and replace with -- expected to confirm --.

Column 21, line 10, delete "hold" and replace with -- holds --.

Column 21, line 19, delete "SYMMETRX®. storage" and replace with -- SYMMETRX® storage --.

Signed and Sealed this

Twenty-third Day of October, 2007

JON W. DUDAS
*Director of the United States Patent and Trademark Office*